United States Patent
Jiang et al.

(10) Patent No.: US 12,432,261 B2
(45) Date of Patent: Sep. 30, 2025

(54) CALL PROCESSING METHOD AND SYSTEM AND RELATED APPARATUS

(71) Applicant: Huawei Technologies Co., Ltd., Shenzhen (CN)

(72) Inventors: Dehui Jiang, Shenzhen (CN); Jian Liu, Dongguan (CN); Bin Meng, Shenzhen (CN); Hongxia Hao, Shenzhen (CN); Shisheng Wu, Nanjing (CN); Wei Cui, Dongguan (CN); Dong Wang, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 597 days.

(21) Appl. No.: 17/659,263

(22) Filed: Apr. 14, 2022

(65) Prior Publication Data

US 2022/0240128 A1 Jul. 28, 2022

Related U.S. Application Data

(63) Continuation of application No. PCT/CN2020/110908, filed on Aug. 24, 2020.

(30) Foreign Application Priority Data

Oct. 16, 2019 (CN) .......................... 201910984954.3
Feb. 12, 2020 (CN) .......................... 202010088695.9

(51) Int. Cl.
*H04W 28/26* (2009.01)
*H04L 65/1016* (2022.01)
(Continued)

(52) U.S. Cl.
CPC ...... *H04L 65/1016* (2013.01); *H04L 65/1096* (2013.01); *H04M 3/42017* (2013.01); *H04W 28/26* (2013.01)

(58) Field of Classification Search
CPC ......... H04L 65/1101; H04L 2012/2849; H04L 65/1016; H04L 65/403; H04L 65/1083
See application file for complete search history.

(56) References Cited

U.S. PATENT DOCUMENTS

2008/0198745 A1  8/2008  Shaikh et al.
2010/0054239 A1  3/2010  Torres et al.
(Continued)

FOREIGN PATENT DOCUMENTS

CN   1996999 A    7/2007
CN   101043647 A  9/2007
(Continued)

OTHER PUBLICATIONS

3rd Generation Partnership Project; Technical Specification Group Core Network and Terminals; IP Multimedia Subsystem (IMS) Customized Alerting Tones (CAT); Protocol specification (Release 15), 3GPP TS 24.182, Mar. 2018, 156 Pages, V15.0.0.
(Continued)

*Primary Examiner* — Romani Ohri
(74) *Attorney, Agent, or Firm* — Slater Matsil, LLP

(57) ABSTRACT

A call processing method comprises: a network device receives a call request message sent by an originating UE, determines, according to the call request message, that the originating UE supports a resource reservation procedure, and further transmits, to a media server, indication information indicating that use of the resource reservation procedure for negotiation about first media is not supported and use of the resource reservation procedure for negotiation about second media is supported, so that negotiation about the second media is implemented by using the resource reservation procedure.

20 Claims, 8 Drawing Sheets

(51) Int. Cl.
H04L 65/1096 (2022.01)
H04M 3/42 (2006.01)

(56) References Cited

U.S. PATENT DOCUMENTS

| | | | |
|---|---|---|---|
| 2015/0063310 A1* | 3/2015 | Shi | H04W 8/02 |
| | | | 370/331 |
| 2015/0172349 A1* | 6/2015 | Gonzalez De Langarica | |
| | | | H04L 65/65 |
| | | | 709/219 |
| 2016/0353315 A1* | 12/2016 | Li | H04W 24/04 |
| 2017/0163695 A1 | 6/2017 | Wang et al. | |
| 2019/0052682 A1 | 2/2019 | Sarashiya | |
| 2019/0313229 A1* | 10/2019 | Chiang | H04W 4/90 |

FOREIGN PATENT DOCUMENTS

| | | |
|---|---|---|
| CN | 101582950 A | 11/2009 |
| CN | 102130888 A | 7/2011 |

OTHER PUBLICATIONS

Huawei et al., "CAT & CRS Supplement", 3GPP TSG CT WG1 Meeting #116, C1-192029, Apr. 8-12, 2019, 6 Pages, Xi'an, P.R. of China.

Lu, P. et al., "Research on Key Techniques of Multimedia Ringback Music Services for VoIL TE Terminal", Mobile Communications, Jun. 25, 2017, 8 Pages.

* cited by examiner

CALL PROCESSING METHOD AND SYSTEM AND RELATED APPARATUS

CROSS-REFERENCE TO RELATED APPLICATIONS

This application is a continuation of International Application No. PCT/CN2020/110908, filed on Aug. 24, 2020, which claims priority to Chinese Patent Application No. 202010088695.9, filed on Feb. 12, 2020, and Chinese Patent Application No. 201910984954.3, filed on Oct. 16, 2019. All of the aforementioned patent applications are hereby incorporated by reference in their entireties.

TECHNICAL FIELD

This application relates to the field of communications technologies, and in particular, to a call processing method and system and a related apparatus.

BACKGROUND

As a 4th generation (4G) wireless communications system is deployed and VoLTE (Voice over LTE) is introduced, the wireless communications system can provide high-definition voice and video calls and video ring back tone services.

There are plural scenarios for a communications network, such as a scenario where a communications network supports a resource reservation (i.e., "precondition") mechanism/procedure and a scenario where a communications network does not support the resource reservation mechanism/procedure. Currently, if a communications network does not support the resource reservation mechanism/procedure, media negotiation about video ring back tone is not performed. Consequently, video ring back tone cannot be played, and development of the video ring back tone service is limited.

SUMMARY

Embodiments of this application provide a call processing method and system and a related apparatus, so that when a network does not support use of a resource reservation mechanism/procedure for first media, resource negotiation is performed on second media by using the resource reservation mechanism/procedure, and a function of playing the second media for an originating user equipment (UE) is further implemented, thereby enhancing user experience and facilitating development of a service related to the second media (for example, video ring back tone).

According to a first aspect, an embodiment of this application provides a call processing method. The method includes: A network device receives a first call request message (for example, an INVITE message) sent by an originating UE. The first call request message is used by the originating UE to initiate a call to a terminating UE, and the first call request message includes first indication information indicating that a resource reservation mechanism/procedure is supported. That a resource reservation mechanism/procedure is supported herein may be specifically that the originating UE supports the resource reservation mechanism/procedure. The network device is configured as not supporting use of the resource reservation mechanism/procedure for negotiation about first media and supporting use of the resource reservation mechanism/procedure for negotiation about second media. In this case, the network device sends a second call request message (for example, an INVITE message) to a media server based on the configuration and the first call request message. The second call request message includes second indication information, and the second indication information indicates that use of the resource reservation mechanism/procedure for negotiation about the first media is not supported and use of the resource reservation mechanism/procedure for negotiation about the second media is supported. The network device receives a first update message (for example, an UPDATE message) sent by the media server. The first update message includes SDP of audio/video that is of the media server (for example, session description protocol (Session Description Protocol, SDP) information of the media server) and that is used for negotiation about the second media, the first update message may further include third indication information, and the third indication information indicates that negotiation about the second media is performed through a resource reservation mechanism/procedure. The network device forwards the first update message to the originating UE.

The method can avoid a case in which information that indicates that the resource reservation mechanism/procedure is supported and that is in the call request message sent by the originating UE is discarded because a network does not support use of the resource reservation mechanism/procedure for negotiation about the first media. The network device transmits, to the media server, information indicating that use of the resource reservation mechanism/procedure for negotiation about the second media is supported, so that the media server enables resource negotiation about the second media by using the resource reservation mechanism/procedure. Further, the second media can be played for the originating UE when the network does not support use of the resource reservation mechanism/procedure for negotiation about the first media, so that user experience is enriched and development of a service related to the second media (for example, video ring back tone) is facilitated.

In a possible design, the method further includes: The network device receives a first response message (for example, a 183 message) that corresponds to the second call request message and that is sent by the media server. The first response message indicates that negotiation about the first media is not performed through a resource reservation mechanism/procedure. The network device forwards the first response message to the originating UE. Negotiation about the first media is not performed through a resource reservation mechanism/procedure, so that burden on the network can be relieved, and a call connection is not affected.

In a possible design, that the first response message indicates that negotiation about the first media is not performed between the terminating UE and the originating UE through a resource reservation mechanism/procedure specifically includes: the first response message does not include a "precondition" field.

In a possible design, the second indication information includes fourth indication information indicating that use of the resource reservation mechanism/procedure for negotiation about the first media is not supported and fifth indication information indicating that use of the resource reservation mechanism/procedure for negotiation about the second media is supported. The fourth indication information includes that a first header field of the second call request message does not include a first field, and the fifth indication information includes that a second header field of the second call request message includes the first field or the first header field of the second call request message includes a second field. The first header field is a "Supported" header field or a "Require" header field, and the second header field is used to include information about a capability of the network to support the resource reservation mechanism/procedure. The second header field may be specifically a header field, for example, a PX header field, a P-Enable header field, or a Precondition-Enable header field, other than the first header field. The first field is a "precondition" field, the second field is used to indicate that the network supports the resource reservation mechanism/procedure for the second media, and the second field may be specifically a field, for example, px, p-enable, p_enable, pcat, p-enable-cat, cat, or 1, other than the first field (the precondition field). The fourth indication information can enable information indicating that use of the resource reservation mechanism/procedure for negotiation about the first media is not supported to be transmitted, for example, to the terminating UE, so that the terminating UE determines that negotiation about the first media is not performed through a resource reservation mechanism/procedure. In addition, the method can avoid a case in which when forwarding the second call request message, another device configured as using the resource reservation mechanism/procedure for negotiation about the first media discards information indicating that use of the resource reservation mechanism/procedure for negotiation about the second media is supported.

In a possible design, the third indication information includes sixth indication information indicating that the SDP of audio/video of the media server is related to the second media and seventh indication information indicating that the resource reservation mechanism/procedure is used. The sixth indication information can enable the network device to determine that negotiation about the second media is performed through a resource reservation mechanism/procedure, to avoid a case in which the network device discards the seventh indication information because the network does not support use of the resource reservation mechanism/procedure for negotiation about the first media and avoid a case in which negotiation about the second media cannot be normally performed.

In a possible design, that the network device sends a second call request message to a media server based on the first call request message and the configuration specifically includes: The network device modifies the first call request message into the second call request message based on the configuration of the network device, and sends the second call request message to the media server.

In a possible design, that the network device modifies the first call request message into the second call request message specifically includes: The network device makes, based on the configuration of the network device, the first indication information in the first call request message invalid, and adds the fifth indication information to the first call request message to obtain the second call request message. The first indication information is made invalid to obtain the fourth indication information, to indicate that use of the resource reservation mechanism/procedure for negotiation about the first media is not supported. The fifth indication information is added to indicate that use of the resource reservation mechanism/procedure for negotiation about the second media is supported.

In a possible design, that the network device makes the first indication information in the first call request message invalid and adds the fifth indication information to the first call request message to obtain the second call request message specifically includes: deleting, based on first configuration information, the first field included in the first header field in the first call request message; and adding the second field included in the second header field to the first call request message, or adding the second field included in the first header field to the first call request message, to obtain the second call request message. In this way, information indicating that use of the resource reservation mechanism/procedure for negotiation about the first media is not supported and use of the resource reservation mechanism/procedure for negotiation about the second media is supported can be transmitted to the media server. In a process of transmitting the second call request message, another device that does not support use of the resource reservation mechanism/procedure for negotiation about the first media does not discard the first field in the second header field, or does not discard the second field, to avoid a case in which the media server cannot obtain information indicating that use of the resource reservation mechanism/procedure for negotiation about the second media is supported and therefore cannot perform negotiation about the second media.

In a possible design, the first update message further includes eighth indication information indicating that the media server has completed resource reservation for the second media.

In a possible design, the method further includes: The network device receives a second response message (for example, a 200 OK message) that corresponds to the first update message and that is sent by the originating UE. The second response message includes SDP of audio/video of the originating UE (for example, SDP information of the originating UE), namely, a negotiation result of the second media, and the second response message includes ninth indication information indicating that the originating UE has completed resource reservation for the second media. Negotiation about the second media is performed through a resource reservation mechanism/procedure, so that it can be ensured that both the originating UE and the media server have completed resource reservation when the media server plays the second media for the originating UE, and the second media can be normally played. This avoids the following case: When the media server plays the second media for the originating UE, the originating UE has not completed resource reservation, and therefore the originating UE is unable to receive some or all of the second media, affecting user experience.

In a possible design, the method further includes: The network device receives a second response message (for example, a 200 OK message) that corresponds to the first update message and that is sent by the originating UE. The second response message includes SDP of audio/video of the originating UE (for example, SDP information of the originating UE), namely, a negotiation result of the second media, and the second response message includes tenth indication information indicating that the originating UE has not completed resource reservation for the second media. The network device receives a second update message (an UPDATE message) sent by the originating UE. The second update message indicates that the originating UE has completed resource reservation for the second media.

In a possible design, the network device is specifically a call session control function device.

According to a second aspect, an embodiment of this application provides a call processing method. The method includes: A media server receives a second call request message (for example, an INVITE message) sent by a network device. The second call request message is used by an originating UE to initiate a call to a terminating UE, the second call request message includes second indication information, and the second indication information indicates that use of a resource reservation mechanism/procedure for negotiation about first media is not supported and use of the resource reservation mechanism/procedure for negotiation about second media is supported. The media server sends a first update message (for example, an UPDATE message) to the originating UE. The first update message includes SDP of audio/video that is of the media server (for example, SDP information of the media server) and that is used for negotiation about the second media, the first update message may further include third indication information, and the third indication information indicates that negotiation about the second media is performed through a resource reservation mechanism/procedure.

In the method, information indicating that use of the resource reservation mechanism/procedure for negotiation about the second media is supported can be transmitted to the media server. This avoids a case in which the information is discarded because a network does not support use of the resource reservation mechanism/procedure for negotiation about the first media, so that the media server can enable resource negotiation about the second media by using the resource reservation mechanism/procedure. Further, the second media can be played for the originating UE when the network does not support use of the resource reservation mechanism/procedure for negotiation about the first media, so that user experience is enriched and development of a service related to the second media (for example, video ring back tone) is facilitated.

In a possible design, the method further includes: The media server forwards the second call request message to the terminating UE, so that the terminating UE determines, according to the second indication information in the second call request message, that negotiation about the first media is not performed through a resource reservation mechanism/procedure.

In a possible design, the method further includes: The media server receives a first response message (for example, a 183 message) that corresponds to the second call request message and that is sent by the terminating UE. The first response message indicates that negotiation about the first media is not performed through a resource reservation mechanism/procedure. Specifically, the first response message does not include a "precondition" field.

In a possible design, the method further includes: The media server sends the first response message (for example, a 183 message) specific to the second call request message to the originating UE. The first response message indicates that negotiation about the first media is not performed between the terminating UE and the originating UE through a resource reservation mechanism/procedure. Specifically, the first response message does not include a "precondition" field.

In a possible design, the second indication information includes fourth indication information indicating that use of the resource reservation mechanism/procedure for negotiation about the first media is not supported and fifth indication information indicating that use of the resource reservation mechanism/procedure for negotiation about the second media is supported. The fourth indication information includes that a first header field of the second call request message does not include a first field, and the fifth indication information includes that a second header field of the second call request message includes the first field or the first header field of the second call request message includes a second field. The first header field is a "Supported" header field or a "Require" header field, and the second header field is used to include information about a capability of the network to support the resource reservation mechanism/procedure. The second header field may be specifically a header field, for example, a PX header field, a P-Enable header field, or a Precondition-Enable header field, other than the first header field. The first field is a "precondition" field, the second field is used to indicate that the network supports the resource reservation mechanism/procedure for the second media, and the second field may be specifically a field, for example, px, p-enable, p_enable, pcat, p-enable-cat, cat, or 1, other than the first field (the precondition field).

The fourth indication information can enable information indicating that use of the resource reservation mechanism/procedure for negotiation about the first media is not supported to be transmitted, for example, to the terminating UE, so that the terminating UE determines that negotiation about the first media is not performed through a resource reservation mechanism/procedure. In addition, the method can avoid a case in which when forwarding the second call request message, another device configured as using the resource reservation mechanism/procedure for negotiation about the first media discards information indicating that use of the resource reservation mechanism/procedure for negotiation about the second media is supported.

In a possible design, the third indication information includes sixth indication information indicating that the SDP of audio/video of the media server is related to the second media and seventh indication information indicating that the resource reservation mechanism/procedure is used. The sixth indication information can enable the network device to determine that negotiation about the second media is performed through a resource reservation mechanism/procedure, to avoid a case in which the network device discards the seventh indication information because the network does not support use of the resource reservation mechanism/procedure for negotiation about the first media and avoid a case in which negotiation about the second media cannot be normally performed.

In a possible design, the network device is specifically a call session control function device.

In a possible design, the first update message further includes eighth indication information indicating that the media server has completed resource reservation for the second media.

In a possible design, that the media server sends a first update message to the originating UE specifically includes: The media server sends the first update message to the originating UE through the network device.

In a possible design, the method further includes: The media server receives a second response message (for example, a 200 OK message) that corresponds to the first update message and that is sent by the originating UE. The second response message includes SDP of audio/video of the originating UE (for example, SDP information of the originating UE), namely, a negotiation result of the second media, and the second response message includes ninth indication information indicating that the originating UE has completed resource reservation for the second media. Negotiation about the second media is performed through a resource reservation mechanism/procedure, so that it can be ensured that both the originating UE and the media server have completed resource reservation when the media server plays the second media for the originating UE, and the second media can be normally played. This avoids the following case: When the media server plays the second media for the originating UE, the originating UE has not completed resource reservation, and therefore the originating UE is unable to receive some or all of the second media, affecting user experience.

In a possible design, the method further includes: The media server receives a second response message (for example, a 200 OK message) that corresponds to the first update message and that is sent by the originating UE. The second response message includes SDP of audio/video of the originating UE (for example, SDP information of the originating UE), namely, a negotiation result of the second media, and the second response message includes tenth indication information indicating that the originating UE has not completed resource reservation for the second media. The media server receives a second update message (an UPDATE message) sent by the originating UE. The second update message indicates that the originating UE has completed resource reservation for the second media.

According to a third aspect, an embodiment of this application provides a call processing method. The method includes: A network device receives a first call request message (for example, an INVITE message) sent by an originating UE. The first call request message is used by the originating UE to initiate a call to a terminating UE, and the first call request message indicates that a resource reservation mechanism/procedure is supported. That a resource reservation mechanism/procedure is supported herein may be specifically that the originating UE supports the resource reservation mechanism/procedure. Then the network device sends a second call request message (for example, an INVITE message) to a media server based on the first call request message. The second call request message indicates that a resource reservation mechanism/procedure for first media is not supported and a resource reservation mechanism/procedure for second media is supported. Further, the network device receives a first update message (for example, an UPDATE message) sent by the media server. The first update message includes SDP of audio/video that is of the media server (for example, SDP information of the media server) and that is used for negotiation about the second media, and the first update message indicates that negotiation about the second media is performed through a resource reservation mechanism/procedure. The network device forwards the first update message to the originating UE.

In the method, the resource reservation mechanism/procedure may fall into the resource reservation mechanism/procedure for the first media and the resource reservation mechanism/procedure for the second media, so that whether the resource reservation mechanism/procedure for the first media is supported (or used) and whether the resource reservation mechanism/procedure for the second media is supported (or used) can be separately considered. When a network does not support the resource reservation mechanism/procedure for the first media, the resource reservation mechanism/procedure can still be used for negotiation about the second media, so that development of a service of the second media (for example, video ring back tone) is facilitated. Specifically, the method can avoid a case in which information indicating that the originating UE supports the resource reservation mechanism/procedure is discarded because the network does not support the resource reservation mechanism/procedure for the first media. The network device transmits, to the media server, information indicating that use of the resource reservation mechanism/procedure for negotiation about the second media is supported, so that the media server enables resource negotiation about the second media by using the resource reservation mechanism/procedure.

In a possible design, the network device does not support the resource reservation mechanism/procedure for the first media and supports the resource reservation mechanism/procedure for the second media. Specifically, the network device stores configuration information that the resource reservation mechanism/procedure for the first media is not supported and the resource reservation mechanism/procedure for the second media is supported. The network device determines, according to the received first call request message, that the originating UE supports the resource reservation mechanism/procedure, and further, the network device transmits, to the media server based on the configuration information, information indicating that the resource reservation mechanism/procedure for the second media is supported, so that the media server determines that the network and the originating UE support the resource reservation mechanism/procedure for the second media, and therefore the media server and the originating UE can subsequently negotiate about the second media by using the resource reservation mechanism/procedure.

In a possible design, that the second call request message indicates that a resource reservation mechanism/procedure for first media is not supported and a resource reservation mechanism/procedure for second media is supported includes: the second call request message indicates that the originating UE supports the resource reservation mechanism/procedure and the network does not support the resource reservation mechanism/procedure for the first media and supports the resource reservation mechanism/procedure for the second media.

In a possible design, that the second call request message indicates that a resource reservation mechanism/procedure for first media is not supported and a resource reservation mechanism/procedure for second media is supported includes: a first header field of the second call request message does not include a first field (for example, a Supported header field of the second call request message does not include a precondition field), to indicate that the resource reservation mechanism/procedure for the first media is not supported, and the second call request message includes indication information indicating that the resource reservation mechanism/procedure for the second media is supported.

In a possible design, that the second call request message includes indication information indicating that the resource reservation mechanism/procedure for the second media is supported includes: the second call request message includes a second field. The second field is used to indicate that the network supports the resource reservation mechanism/procedure for the second media and/or the network device supports the resource reservation mechanism/procedure for the second media and/or the originating UE supports the resource reservation mechanism/procedure. The network herein is an IMS domain core network to which the network device belongs. The second field may be specifically a field, for example, pcat, p-enable-cat, cat, or 1, other than "precondition". The second field can enable information indicating that the resource reservation mechanism/procedure for the second media is supported to be transmitted.

In a possible design, that the second call request message includes a second field may be specifically: a first header field (for example, a Supported header field or a Require header field) in the second call request message includes the second field, or a second header field in the second call request message includes the second field. The first header field is used to include information about a capability of the network to support the resource reservation mechanism/ procedure and/or information about a capability of the network device to support the resource reservation mechanism/procedure and/or information about a capability of the originating UE to support the resource reservation mechanism/procedure. The second header field may be specifically a header field, for example, a PX header field, a P-Enable header field, or a Precondition-Enable header field, other than the first header field.

In a possible design, that the first call request message indicates that the originating UE supports a resource reservation mechanism/procedure includes: a first header field (for example, a Supported header field or a Require header field) of the first call request message includes the first field (for example, a precondition field), to indicate that the originating UE supports the resource reservation mechanism/procedure. The sending a second call request message to a media server based on the first call request message specifically includes: The network device deletes the first field in the first header field of the first call request message based on a case in which the network device is configured as not supporting the resource reservation mechanism/procedure for the first media and supporting the resource reservation mechanism/procedure for the second media, and inserts the second field indicating that the network supports the resource reservation mechanism/procedure for the second media, to obtain the second call request message; and sends the second call request message to the media server.

In a possible design, that the first call request message indicates that the originating UE supports a resource reservation mechanism/procedure includes: a first header field (for example, a Supported header field or a Require header field) of the first call request message includes the first field (for example, a precondition field), to indicate that the originating UE supports the resource reservation mechanism/procedure. The sending a second call request message to a media server based on the first call request message specifically includes: The network device deletes the first field in the first header field of the first call request message, and inserts the second field indicating that the network supports the resource reservation mechanism/procedure for the second media, to obtain the second call request message; and sends the second call request message to the media server.

In a possible design, negotiation about the second media is performed through a resource reservation mechanism/procedure; and that the network device forwards the first update message to the originating UE includes: The network device forwards the first update message to the originating UE based on indication information (for example, a g.3gpp.crs parameter) that indicates that the media capability information is related to the second media and that is included in the first update message and a case in which the network device supports the resource reservation mechanism/procedure for the second media. A Supported header field of the first update message includes a precondition value, and the first update message further includes a QoS parameter, to indicate that negotiation about the second media is performed through a resource reservation mechanism/procedure. The network device determines, according to the indication information indicating that the media capability information is related to the second media, that the second media is currently negotiated about by using the resource reservation mechanism/procedure, and therefore does not delete the precondition value and the QoS parameter.

In a possible design, the method further includes: The network device receives a first response message (for example, a 183 message) that corresponds to the second call request message and that is sent by the terminating UE. The first response message indicates that negotiation about the first media is not performed through a resource reservation mechanism/procedure. The network device forwards the first response message to the originating UE. Specifically, the first response message does not include a "precondition" field, and/or the first response message does not include a QoS parameter. Negotiation about the first media is not performed through a resource reservation mechanism/procedure, so that burden on the network can be relieved, and a call connection is not affected.

In a possible design, the second call request message indicates that negotiation about the first media is not performed between the terminating UE and the originating UE through a resource reservation mechanism/procedure. Specifically, the second call request message does not include a "precondition" field, and/or the second call request message does not include a QoS parameter.

In a possible design, the first update message further indicates that the media server has completed resource reservation for the second media.

In a possible design, the method further includes: The network device receives a second response message (for example, a 200 OK message) that corresponds to the first update message and that is sent by the originating UE. The second response message includes SDP of audio/video of the originating UE (for example, SDP information of the originating UE), namely, a negotiation result of the second media, and the second response message further indicates that the originating UE has completed resource reservation for the second media. Negotiation about the second media is performed through a resource reservation mechanism/procedure, so that it can be ensured that both the originating UE and the media server have completed resource reservation when the media server plays the second media for the originating UE, and the second media can be normally played. This avoids the following case: When the media server plays the second media for the originating UE, the originating UE has not completed resource reservation, and therefore the originating UE is unable to receive some or all of the second media, affecting user experience.

In a possible design, the method further includes: The network device receives a second response message (for example, a 200 OK message) that corresponds to the first update message and that is sent by the originating UE. The second response message includes SDP of audio/video of the originating UE (for example, SDP information of the originating UE), namely, a negotiation result of the second media, and the second response message includes indication information indicating that the originating UE has not completed resource reservation for the second media. The network device receives a second update message (an UPDATE message) sent by the originating UE. The second update message indicates that the originating UE has completed resource reservation for the second media.

In a possible design, the network device is specifically a call session control function device such as a proxy-call session control function (P-CSCF) device.

According to a fourth aspect, an embodiment of this application provides a call processing method, including: A media server receives a call request message (for example, an INVITE message). The call request message is used by an originating UE to initiate a call to a terminating UE, and the call request message indicates that a resource reservation mechanism/procedure for first media is not supported and a resource reservation mechanism/procedure for second media is supported. Then the media server negotiates with the originating UE about the second media by using the resource reservation mechanism/procedure.

In the method, the resource reservation mechanism/procedure may fall into the resource reservation mechanism/procedure for the first media and the resource reservation mechanism/procedure for the second media, so that whether the resource reservation mechanism/procedure for the first media is supported (or used) and whether the resource reservation mechanism/procedure for the second media is supported (or used) can be separately considered. When a network does not support the resource reservation mechanism/procedure for the first media, the resource reservation mechanism/procedure can still be used for negotiation about the second media, so that development of a service of the second media is facilitated. Specifically, in the method, information indicating that use of the resource reservation mechanism/procedure for negotiation about the second media is supported can be transmitted to the media server. This avoids a case in which the information is discarded because the network does not support use of the resource reservation mechanism/procedure for negotiation about the first media, so that the media server can enable resource negotiation about the second media by using the resource reservation mechanism/procedure.

In a possible design, that the media server negotiates with the originating UE about the second media by using the resource reservation mechanism/procedure specifically includes: The media server sends a first update message (for example, an UPDATE message) to the originating UE. The first update message includes SDP of audio/video that is of the media server (for example, SDP information of the media server) and that is used for negotiation about the second media, and the first update message indicates that negotiation about the second media is performed through a resource reservation mechanism/procedure.

In a possible design, the method further includes: The media server forwards the call request message to the terminating UE. Further, the media server receives a first response message that corresponds to the call request message and that is sent by the terminating UE. The first response message indicates that negotiation about the first media is not performed through a resource reservation mechanism/procedure.

In a possible design, the method further includes: sending the first response message specific to the call request message to the originating UE. The first response message indicates that negotiation about the first media is not performed through a resource reservation mechanism/procedure.

In a possible design, the call request message indicates that a resource reservation mechanism/procedure for first media is not supported and a resource reservation mechanism/procedure for second media is supported includes: a first header field of the call request message does not include a first field (for example, a Supported header field of the second call request message does not include a precondition field), to indicate that the resource reservation mechanism/procedure for the first media is not supported, and the call request message includes indication information indicating that the resource reservation mechanism/procedure for the second media is supported.

In a possible design, that the call request message includes indication information indicating that the resource reservation mechanism/procedure for the second media is supported includes: the call request message includes a second field. The second field is used to indicate that the network supports the resource reservation mechanism/procedure for the second media and/or a network device supports the resource reservation mechanism/procedure for the second media and/or the originating UE supports the resource reservation mechanism/procedure. The network herein is an IMS domain core network to which the network device belongs. The second field may be specifically a field, for example, pcat, p-enable-cat, cat, or 1, other than "precondition". The second field can enable information indicating that the resource reservation mechanism/procedure for the second media is supported to be transmitted.

In a possible design, that the call request message includes a second field may be specifically: a first header field (for example, a Supported header field or a Require header field) in the call request message includes the second field, or a second header field in the call request message includes the second field. The second header field is used to include information about a capability of the network to support the resource reservation mechanism/procedure and/or information about a capability of the network device to support the resource reservation mechanism/procedure and/or information about a capability of the originating UE to support the resource reservation mechanism/procedure. The second header field may be specifically a header field, for example, a PX header field, a P-Enable header field, or a Precondition-Enable header field, other than the first header field.

In a possible design, the media server determines, based on the case in which the call request message includes the second field, that the originating UE supports the resource reservation mechanism/procedure and/or the network supports the resource reservation mechanism/procedure for the second media, and further, the media server negotiates about the second media by using the resource reservation mechanism/procedure, so that a negotiation success rate can be increased.

In a possible design, the first update message further indicates that the media server has completed resource reservation for the second media.

In a possible design, that the media server sends a first update message to the originating UE specifically includes: The media server sends the first update message to the originating UE through the network device.

In a possible design, the method further includes: The media server receives a second response message (for example, a 200 OK message) that corresponds to the first update message and that is sent by the originating UE. The second response message includes SDP of audio/video of the originating UE (for example, SDP information of the originating UE), namely, a negotiation result of the second media, and the second response message indicates that the originating UE has completed resource reservation for the second media. Negotiation about the second media is performed through a resource reservation mechanism/procedure, so that it can be ensured that both the originating UE and the media server have completed resource reservation when the media server plays the second media for the originating UE, and the second media can be normally played. This avoids the following case: When the media server plays the second media for the originating UE, the originating UE has not completed resource reservation, and therefore the originating UE is unable to receive some or all of the second media, affecting user experience.

In a possible design, the method further includes: The media server receives a second response message (for example, a 200 OK message) that corresponds to the first update message and that is sent by the originating UE. The second response message includes SDP of audio/video of the originating UE (for example, SDP information of the originating UE), namely, a negotiation result of the second media, and the second response message indicates that the originating UE has not completed resource reservation for the second media. The media server receives a second update message (an UPDATE message) sent by the originating UE. The second update message indicates that the originating UE has completed resource reservation for the second media.

According to a fifth aspect, an embodiment of this application provides a network device. The network device has a function of implementing either of the methods in the first aspect and the third aspect. The function may be implemented by hardware, or may be implemented by hardware executing corresponding software. The hardware or software includes one or more units corresponding to the function, for example, a storage unit, a sending unit, a receiving unit, or a processing unit.

In a possible design, a structure of the network device includes at least one processor and memory, the memory stores program code, and the processor invokes the program code to perform some or all steps of either of the methods in the first aspect and the third aspect. The network device may further include a communications interface, configured to communicate with another device.

According to a sixth aspect, an embodiment of this application provides a media server. The media server has a function of implementing either of the methods in the second aspect and the fourth aspect. The function may be implemented by hardware, or may be implemented by hardware executing corresponding software. The hardware or software includes one or more units corresponding to the function, for example, a sending unit, a receiving unit, or a processing unit.

In a possible design, a structure of the media server includes at least one processor and memory, the memory stores program code, and the processor invokes the program code to perform some or all steps of either of the methods in the second aspect and the fourth aspect. The media server may further include a communications interface, configured to communicate with another device.

According to a seventh aspect, an embodiment of this application provides a call processing method. The method includes: A network device receives a first call request message sent by an originating UE. The first call request message is used by the originating UE to initiate a call to a terminating UE, and the first call request message includes first indication information indicating that a resource reservation mechanism/procedure is supported. The network device sends a second call request message to a media server based on the first call request message and first configuration information stored in the network device. The first configuration information is that use of the resource reservation mechanism/procedure for negotiation about first media is not supported and use of the resource reservation mechanism/procedure for negotiation about second media is supported, the second call request message includes second indication information, and the second indication information indicates that use of the resource reservation mechanism/procedure for negotiation about the first media is not supported and use of the resource reservation mechanism/procedure for negotiation about the second media is supported. The media server forwards the second call request message to the terminating UE. The media server sends a first update message to the network device. The first update message includes SDP of audio/video that is of the media server (for example, SDP information of the media server) and that is used for negotiation about the second media, the first update message may further include third indication information, and the third indication information indicates that negotiation about the second media is performed through a resource reservation mechanism/procedure. The network device sends the first update message to the originating UE.

According to an eighth aspect, an embodiment of this application provides a call processing method. The method includes: A network device receives a first call request message sent by an originating UE. The first call request message indicates that the originating UE supports a resource reservation mechanism/procedure. Then the network device sends a second call request message to a media server based on the first call request message. The second call request message indicates that use of the resource reservation mechanism/procedure for negotiation about first media is not supported and use of the resource reservation mechanism/procedure for negotiation about second media is supported. The media server forwards the second call request message to a terminating UE. Further, the media server negotiates, based on the second call request message, with the originating UE about the second media by using the resource reservation mechanism/procedure.

In a possible design, that the media server negotiates, based on the second call request message, with the originating UE about the second media by using the resource reservation mechanism/procedure includes: sending a first update message to the originating UE through the network device. The first update message includes SDP of audio/video that is of the media server and that is used for negotiation about the second media, and the first update message indicates that negotiation about the second media is performed through a resource reservation mechanism/procedure.

According to a ninth aspect, an embodiment of this application provides a call processing system, including the network device according to the fifth aspect and the media server according to the sixth aspect. Details are not described herein again.

According to a tenth aspect, an embodiment of this application provides a computer storage medium. The computer storage medium stores program code, and the program code includes instructions used to perform some or all steps of either of the methods in the first aspect and the third aspect.

According to an eleventh aspect, an embodiment of this application provides a computer storage medium. The computer storage medium stores program code, and the program code includes instructions used to perform some or all steps of either of the methods in the second aspect and the fourth aspect.

According to a twelfth aspect, an embodiment of this application provides a computer program product. When the computer program product runs on a computer, the computer is enabled to perform some or all steps of either of the methods in the first aspect and the third aspect.

According to a thirteenth aspect, an embodiment of this application provides a computer program product. When the computer program product runs on a computer, the computer is enabled to perform some or all steps of either of the methods in the second aspect and the fourth aspect.

BRIEF DESCRIPTION OF THE DRAWINGS

To describe technical solutions in embodiments or the background of this application more clearly, the following describes the accompanying drawings used in embodiments or the background of this application.

DETAILED DESCRIPTION OF ILLUSTRATIVE EMBODIMENTS

The following describes embodiments of this application with reference to the accompanying drawings in embodiments of this application.

To make a person skilled in the art understand the technical solutions in this application better, the following clearly describes the technical solutions in embodiments of this application with reference to the accompanying drawings in embodiments of this application. It is clear that the described embodiments are merely a part rather than all of embodiments of this application. All other embodiments obtained by a person of ordinary skill in the art based on embodiments of this application without creative efforts shall fall within the protection scope of this application.

In the descriptions of this application, "/" represents an "or" relationship between associated objects unless otherwise specified. For example, A/B may represent A or B. The term "and/or" in this application represents only an association relationship for describing associated objects and represents that three relationships may exist. For example, A and/or B may represent the following three cases: Only A exists, both A and B exist, and only B exists, where A and B may be singular or plural. In addition, in embodiments of this application, terms such as "first" and "second" are used to distinguish between same objects or similar objects whose functions and purposes are basically the same, to clearly describe the technical solutions in embodiments of this application. A person skilled in the art may understand that the terms such as "first" and "second" do not limit a quantity or an execution sequence, and the terms such as "first" and "second" do not indicate a definite difference.

Embodiments of this application are applicable to a 4th generation (4G) mobile communications network architecture, a 5th generation (5G) mobile communications network architecture, or a future network. For ease of description, the following describes a network architecture and a method procedure of the solutions by using a 4G network architecture as an example.

Figure 1:
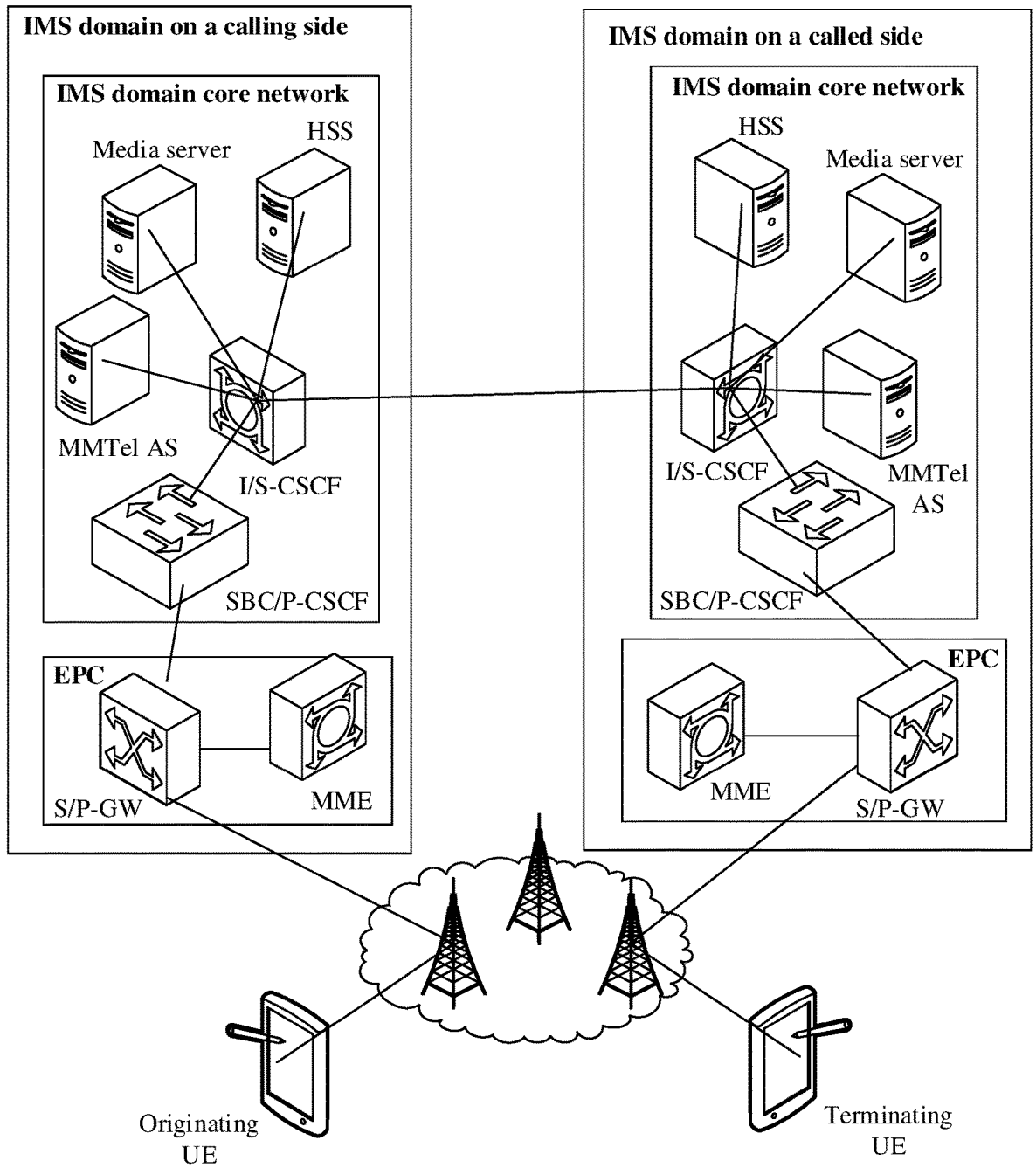
FIG. 1 is a schematic diagram of a system architecture to which embodiments of this application are applied.

FIG. 1 is a diagram of a system architecture in which embodiments of this application are applied to a VoLTE network. The system architecture may include an originating user equipment (UE), a terminating UE, a wireless network, an internet protocol (IP) multimedia subsystem (IMS) domain network on a calling side, and an IMS domain network on a called side.

The IMS domain on the calling side and the IMS domain on the called side each may include an IMS domain core network and an evolved packet core (EPC) network. The IMS domain core network includes a serving-call session control function (S-CSCF) device, an interrogating-call session control function (I-CSCF) device, a proxy-call session control function (P-CSCF) device, a home subscriber server (HSS), a session border controller (SBC) device, and some dedicated servers such as a multimedia telephony application server (MMTel AS). The I-CSCF device and the S-CSCF device may be disposed together, and may be referred to as an "I/S-CSCF" device. The SBC device and the P-CSCF device may be disposed together, and may be referred to as an "SBC/P-CSCF" device. The EPC network may include a packet data network gateway (PGW) device, a serving gateway (SGW) device, and a mobility management entity (MME) device. The PGW device and the SGW device may be disposed together, and may be referred to as an "SGW/PGW" device.

All the foregoing network devices are corresponding network devices in a wireless communications network in the conventional technology. Details are described herein merely briefly instead of in detail. For example, the HSS may be configured to store subscription information and location information. The SBC device can provide secure access and media processing. The MMTel AS device provides basic and supplementary services of multimedia telephony. The MME device is a core device of the EPC network. The SGW device may be configured to connect the IMS domain core network to the wireless network, and the PGW device may be configured to connect the IMS domain core network to the IP network. The S-CSCF device may be configured to perform user registration, authentication control, session routing, and service triggering control and maintain session status information. The I-CSCF device may be configured to allocate and interrogate an S-CSCF device with which a user registers. The P-CSCF device may be used as a proxy for signaling and a message. In this application, for brevity of description, a CSCF device is used to represent any one or a combination of a plurality of devices in the S-CSCF device, the I-CSCF device, and the P-CSCF device.

The IMS domain core network on the calling side and the called side may further include a media server. The media server provides multimedia play for a caller or a callee. The media server may include a media application server and a media resource function MRF device. The media application server and the MRF device may be disposed together, or may be physically separated. The media application server processes signaling and a message. The MRF device provides a multimedia audio stream and/or a multimedia video stream. It should be understood that, alternatively, the media server may include the media application server but does not include the MRF device. Specifically, the media server provides multimedia play for originating UE or the terminating UE through cooperation with the MRF device.

It should be noted that, for ease of description, in this application, media to be played by a media server for an originating UE is referred to as second media, and the second media may be audio/video media, for example, audio ring back tone, video ring back tone, or video advertising, provided by the caller, the callee, an operator, or a thirdparty user. Call media to be transmitted between an originating UE and a terminating UE is referred to as first media, or may be referred to as regular media.

An originating UE and a terminating UE are devices with a wireless transceiver function, and may be deployed on the land, including an indoor device, an outdoor device, a handheld device, or a vehicle-mounted device; may be deployed on a water surface (for example, on a ship); or may be deployed in the air (for example, on a plane, a balloon, and a satellite). Specifically, the originating UE or the terminating UE may be a terminal device that can access a mobile network, a mobile phone, a tablet computer (pad), a computer with a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. The terminating UE may be a terminal device that can access the mobile network. For details, refer to the descriptions of the originating UE. Alternatively, the terminating UE may be a terminal device that can access a fixed network, for example, a wired telephone set. Alternatively, the terminating UE may be a software terminal corresponding to application software with a call function.

It should be noted that the foregoing descriptions do not constitute a limitation on the diagram of the system architecture in embodiments of this application, and the diagram of the system architecture in embodiments of this application includes but is not limited to the system architecture shown in FIG. 1.

In an optional manner, this application may be further applied to a scenario between a user of the VoLTE network and a user of another network (for example, a fixed network, a switched network, or a 2/3G network). For example, in embodiments of this application, the caller is a VoLTE user, and the callee is a user of another network.

Currently, an operator sets, according to a policy of the operator, a network to not support a resource reservation mechanism/procedure. If the network does not support the resource reservation mechanism/procedure, neither use of the resource reservation mechanism/procedure for negotiation about the first media nor use of the resource reservation mechanism/procedure for negotiation about the second media is supported. Specifically, after receiving a call request message sent by the originating UE, the network device deletes indication information that is included in the call request message and that indicates that the resource reservation mechanism/procedure is supported, and further forwards the call request message in which the indication information is deleted to the media server. The media server determines, according to the call request message in which the indication information is deleted, that the resource reservation mechanism/procedure is not supported. Therefore, the media server does not perform negotiation about the second media with the originating UE. Consequently, the second media cannot be played for the originating UE, experience of the caller is deteriorated, and development of a service of the second media (for example, an audio ring back tone service or a video ring back tone service) is limited.

In this application, it is considered that using the resource reservation mechanism/procedure to negotiate about resource reservation of the first media may strain network resources, because resource reservation of the first media is performed for a large quantity of calls in the network regardless of whether the calls are connected, especially some calls cannot be successfully connected for callees have not answered the calls for a long time, but resources reserved for the first media are occupied, causing a waste of network resources. Regardless of whether the callee answers the call, after the originating UE and the media server complete resource negotiation and resource reservation for the second media, the media server can play the second media for the originating UE, so that user experience is enhanced, and fewer network resources are wasted in comparison with the first media.

In this application, when use of the resource reservation mechanism/procedure for negotiation about the first media is not supported, the network device may transmit, to the media server, information indicating that use of the resource reservation mechanism/procedure for negotiation about the second media is supported, so that the media server enables resource negotiation about the second media by using the resource reservation mechanism/procedure, and plays the second media for the originating UE, thereby enriching user experience and facilitating development of a service related to the second media (for example, video ring back tone).

The resource reservation mechanism/procedure (i.e., precondition mechanism/procedure) means that session participants perform resource reservation (including reserving matched bandwidth, an available frequency band, a port, and the like), and notify each other after completing resource reservation. A session is not further established when the session participants have not completed resource reservation. For example, if negotiation about the second media is performed between the originating UE and the media server through a resource reservation mechanism/procedure, the originating UE and the media server perform resource reservation on the second media, and notify each other after completing resource reservation. After determining that the media server and the originating UE have completed resource reservation, the media server plays the second media for the originating UE. In addition, the resource reservation mechanism/procedure may also be referred to as resource reservation (i.e., precondition(s)) or a resource reservation procedure (i.e., precondition procedure(s)).

It should be understood that in this application, that the resource reservation mechanism/procedure is supported means that there is a capability of using the resource reservation mechanism/procedure and/or use of the resource reservation mechanism/procedure is allowed. That the resource reservation mechanism/procedure is not supported means that there is not a capability of using the resource reservation mechanism/procedure and/or use of the resource reservation mechanism/procedure is not allowed. In addition, not supporting the resource reservation mechanism/procedure is described from perspectives of a device, a network, and the like. In other words, the device does not support the resource reservation mechanism/procedure and/or the network does not support the resource reservation mechanism/procedure. The network herein is an IMS domain core network, and specifically belongs to a calling domain and/or a called domain. Not using the resource reservation mechanism/procedure is described from perspectives of signaling and media negotiation. In other words, signaling does not include a resource reservation completion status and/or media negotiation is not performed through a resource reservation mechanism/procedure. It should be understood that supporting use of the resource reservation mechanism/procedure for negotiation about the first media may be referred to as supporting a resource reservation mechanism/procedure for the first media, and supporting use of the resource reservation mechanism/procedure for negotiation about the second media may be referred to as supporting a resource reservation mechanism/procedure for the second media.

The following describes solutions of this application with reference to specific embodiments.

Figure 2:
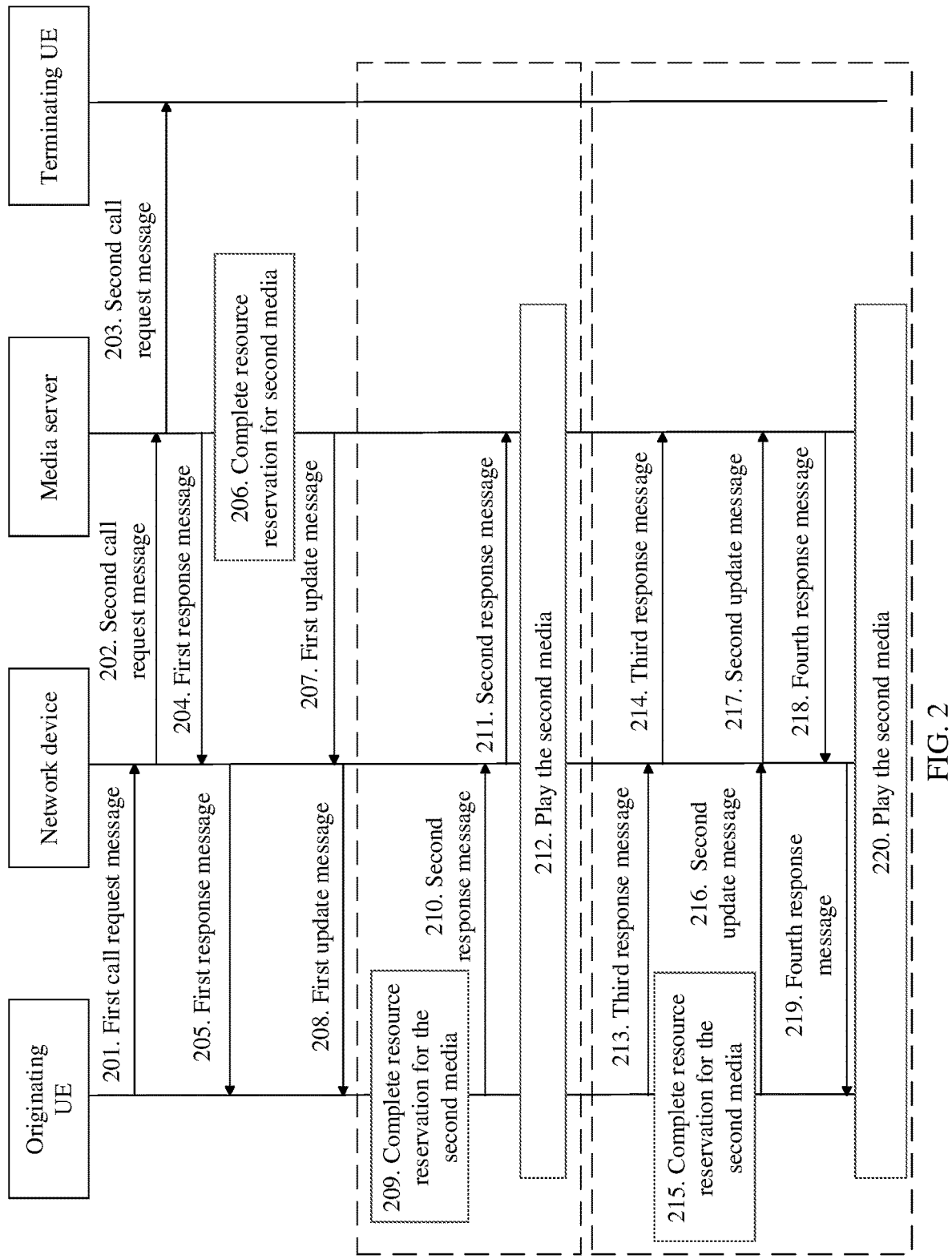
FIG. 2 is a flowchart of a call processing method according to an embodiment of this application.

FIG. 2 is a schematic flowchart of a call processing method 200 according to this application. The method 200 may be applied to the system shown in FIG. 1, or certainly may be applied to another communications scenario. This is not limited in this embodiment of this application. The network device in this application may be any device other than a media server in a communications network in which an originating UE and a terminating UE are located, for example, a CSCF device, an SGW device, a PGW device, an SBC device, or a forward application server of the media server. For details, refer to each network device in the diagram of the system architecture shown in FIG. 1. In addition, the network device may belong to a calling domain or a called domain, and the media server may belong to the calling domain or the called domain. Specific steps are as follows.

201. The network device receives a first call request message sent by the originating UE.

A call initiated by the originating UE to the terminating UE may be specifically a video call or an audio call. The first call request message used by the originating UE to initiate a call to the terminating UE is received and forwarded by the network device. The first call request message may be specifically an INVITE message, and the first call request message includes first indication information indicating that a resource reservation mechanism/procedure is supported. That a resource reservation mechanism/procedure is supported herein may be specifically that the originating UE supports the resource reservation mechanism/procedure, and the network device may determine, according to the first indication information in the first call request message, that the originating UE supports the resource reservation mechanism/procedure. The first indication information may be specifically that a first header field includes a first field. In this application, the first header field is a "Supported" or "Require" header field, and the first field is a "precondition" field. In this case, the first indication information may be specifically that the "Supported" or "Require" header field includes the "precondition" field. The network device determines, according to the first indication information, that the resource reservation mechanism/procedure is supported.

Further, the originating UE may forward the first call request message to the network device by using a device between the originating UE and the network device. If any one of devices between the originating UE and the network device does not support the resource reservation mechanism/procedure, the first indication information in the first call request message is made invalid, for example, the first indication information is deleted or the first indication information is modified. Therefore, if the first call request message received by the network device includes the first indication information, it indicates that the originating UE and the devices between the originating UE and the network device support the resource reservation mechanism/procedure. It should be understood that supporting the resource reservation mechanism/procedure includes supporting use of the resource reservation mechanism/procedure for first media and second media.

The first call request message may further include a quality of service (QoS) parameter, to indicate that current negotiation about the first media is performed through a resource reservation mechanism/procedure. The QoS parameter is used to indicate a resource reservation status, for example, may include a parameter such as a resource reservation completion status of a local end (for example, curr:qos local), a resource reservation completion status of a remote end (for example, curr:qos remote), a desire to complete resource reservation at the local end (for example, des:qos mandatory local), a desire to complete resource reservation at the remote end (for example, des:qos optional remote), or a need to confirm whether the remote end has completed resource reservation (for example, conf:qos remote sendrecv).

Therefore, the first call request message may specifically indicate any one or more of the following: the resource reservation mechanism/procedure is supported, the originating UE supports the resource reservation mechanism/procedure, the device between the originating UE and the network device supports the resource reservation mechanism/procedure, resource reservation mechanism/procedures for the first media and the second media are supported, the originating UE supports the resource reservation mechanism/procedures for the first media and the second media, the device between the originating UE and the network device supports the resource reservation mechanism/procedures for the first media and the second media, and the current negotiation about the first media is performed through a resource reservation mechanism/procedure.

The network device is configured as not supporting use of the resource reservation mechanism/procedure for negotiation about the first media and supporting use of the resource reservation mechanism/procedure for negotiation about the second media, in other words, the network device does not support use of the resource reservation mechanism/procedure for negotiation about the first media, and supports use of the resource reservation mechanism/procedure for negotiation about the second media. Therefore, the network device stores first configuration information. The first configuration information is that use of the resource reservation mechanism/procedure for negotiation about the first media is not supported and use of the resource reservation mechanism/procedure for negotiation about the second media is supported. For example, the network device stores a value "1" of a control bit identifying whether use of the resource reservation mechanism/procedure for negotiation about the first media is supported and a value "o" of a control bit identifying whether use of the resource reservation mechanism/procedure for negotiation about the second media is supported. "1" indicates "not supported", and "o" indicates "supported". The network device may determine, according to the first configuration information and the first indication information, that for a current call, use of the resource reservation mechanism/procedure for negotiation about the first media is not supported and use of the resource reservation mechanism/procedure for negotiation about the second media is supported.

202. The network device sends a second call request message to the media server.

The second call request message is an INVITE message. The network device determines, according to the first call request message, that the originating UE supports the resource reservation mechanism/procedure. The network device sends the second call request message to the media server based on the first call request message. The second call request message indicates that use of the resource reservation mechanism/procedure for negotiation about the first media is not supported and use of the resource reservation mechanism/procedure for negotiation about the second media is supported.

Specifically, the network device sends the second call request message to the media server based on the first call request message and the first configuration information. The second call request message includes second indication information, and the second indication information indicates that use of the resource reservation mechanism/procedure for negotiation about the first media is not supported and use of the resource reservation mechanism/procedure for negotiation about the second media is supported.

The second indication information may include fourth indication information indicating that use of the resource reservation mechanism/procedure for negotiation about the first media is not supported and fifth indication information indicating that use of the resource reservation mechanism/procedure for negotiation about the second media is supported. The fourth indication information includes that a first header field of the second call request message does not include the first field. For example, a "Supported" header field and/or a "Require" header field do or does not include a "precondition" field.

The fifth indication information may be a second field, in other words, the second call request message includes the second field. The second field is used to indicate that a network supports the resource reservation mechanism/procedure for the second media, and the second field may be specifically a field, for example, px, p-enable, p_enable, pcat, p-enable-cat, cat, or 1, other than the first field (the precondition field). It should be noted that a field may also be referred to as a value, an optional tag (option tag), or the like. This is not limited in this application. It should be understood that, because the second field is inserted by the network device when the first call request message indicates that the originating UE supports the resource reservation mechanism/procedure, the second field may further indicate that the originating UE supports the resource reservation mechanism/procedure and/or the network device supports the resource reservation mechanism/procedure for the second media. In addition, the second field may further indicate that the network device does not support the resource reservation mechanism/procedure for the first media and/or the network does not support the resource reservation mechanism/procedure for the first media.

In an optional manner, the fifth indication information includes that the first header field of the second call request message includes the second field. For example, the fifth indication information may be specifically that a "Supported" header field and/or a "Require" header field include or includes a px, pcat, p-enable-cat, cat, or p_enable field.

In an optional manner, the fifth indication information includes that a second header field of the second call request message includes the second field. The second header field is used to include information about a capability of the network to support the resource reservation mechanism/procedure. The second header field may be specifically a header field, for example, a PX header field, a P-Enable header field, or a Precondition-Enable header field, other than the first header field. The second header field may also include a value used to indicate whether the network supports a resource reservation mechanism/procedure for media other than the second media. This is not limited in this application. In addition, because the second header field is inserted by the network device when the first call request message indicates that the originating UE supports the resource reservation mechanism/procedure, the second header field may further indicate information about a capability of the originating UE to support the resource reservation mechanism/procedure and/or information about a capability of the network device to support the resource reservation mechanism/procedure. For example, the fifth indication information may be specifically that a PX or Precondition-Enable header field includes a px, pcat, p-enable-cat, cat, or p_enable field.

In an optional manner, the fifth indication information includes that the second header field of the second call request message includes the first field.

In this application, the second header field and/or the second field are or is introduced to avoid a case in which resource negotiation about the second media cannot be normally performed because another device incorrectly deletes the fifth indication information from the second call request message when receiving the second call request message. Specifically, when a message received by another device that does not support use of the resource reservation mechanism/procedure for negotiation about the first media includes that a first header field includes the first field, the another device may delete the first field from the first header field. Therefore, in this application, the second header field and/or the second field are or is introduced to avoid this case.

The network device deletes, based on the case in which the resource reservation mechanism/procedure for the first media is not supported, the precondition field included in the Supported header field and/or the Require header field in the first call request message, so that the Supported header field and the Require header field in the second call request message do not include the precondition field (the fourth indication information), to indicate that the resource reservation mechanism/procedure for the first media is not supported. That the resource reservation mechanism/procedure for the first media is not supported may be specifically that the network device does not support the resource reservation mechanism/procedure for the first media and/or the network does not support the resource reservation mechanism/procedure for the first media. The network may be specifically an IMS domain core network to which the network device belongs.

Further, the network device adds, to the first call request message based on the case in which the network device supports the resource reservation mechanism/procedure for the second media and the originating UE supports the resource reservation mechanism/procedure, the fifth indication information indicating that the resource reservation mechanism/procedure for the second media is supported. That the resource reservation mechanism/procedure for the second media is supported may be specifically that the network device supports the resource reservation mechanism/procedure for the second media and/or the network supports the resource reservation mechanism/procedure for the second media and/or the originating UE supports the resource reservation mechanism/procedure for the second media.

In conclusion, the network device performs, based on the case in which the resource reservation mechanism/procedure for the first media is not supported and the resource reservation mechanism/procedure for the second media is supported, the foregoing processing on the first call request message to obtain the second call request message. The second call request message may specifically indicate any one or more of the following content: the originating UE supports the resource reservation mechanism/procedure, the network device does not support the resource reservation mechanism/procedure for the first media, the network device supports the resource reservation mechanism/procedure for the second media, the network does not support the resource reservation mechanism/procedure for the first media, the network supports the resource reservation mechanism/procedure for the second media, devices that have transmitted the first call request message and/or devices that have transmitted the second call request message support use of the resource reservation mechanism/procedure for the second media, and at least one device in the devices that have transmitted the first call request message and/or the devices that have transmitted the second call request message does not support use of the resource reservation mechanism/procedure for the first media. It should be understood that the at least one device herein includes the network device. For the network device, the devices that have transmitted the first call request message and/or the devices that have transmitted the second call request message include the originating UE, the device between the originating UE and the network device, and the network device. For the media server, the devices that have transmitted the first call request message and/or the devices that have transmitted the second call request message include the originating UE and devices (the device between the originating UE and the network device, the network device, and a device between the network device and the media server) between the originating UE and the media server.

Specifically, the network device modifies the first call request message into the second call request message based on the case in which the resource reservation mechanism/procedure is supported and the first configuration information. The network device may make the first indication information in the first call request message invalid, and add the fifth indication information to the first call request message to obtain the second call request message.

203. The media server sends the second call request message to the terminating UE.

The media server determines, according to the second call request message, that use of the resource reservation mechanism/procedure for negotiation about the second media is supported. Specifically, the media server may perform the determining according to the fifth indication information in the second call request message. Further, the media server may determine that use of the resource reservation mechanism/procedure for negotiation about the first media is not supported. The media server may obtain the content that is indicated by the second call request message and that is mentioned in step 202. Details are not described herein. Specifically, the media server may send the second call request message to the terminating UE through a network device. The network device herein may be the network device mentioned in step 202 and step 201. For example, the network devices belong to the called domain, or network devices in the calling domain or the called domain are a same device. Alternatively, the network device herein may not be the network device mentioned in step 202 and step 201. For example, the network device mentioned in step 202 and step 201 is a network device in the calling domain, and the network device herein belongs to the called domain.

The terminating UE may determine, according to the second call request message, that negotiation about the first media is not performed through a resource reservation mechanism/procedure. Specifically, the terminating UE may perform the determining according to the fourth indication information in the second call request message, the terminating UE may perform the determining based on a case in which the second call request message does not include a QoS parameter, or the terminating UE performs the determining based on a case in which the terminating UE does not support the resource reservation mechanism/procedure. Therefore, negotiation about the first media is not performed between the originating UE and the terminating UE through a resource reservation mechanism/procedure. The terminating UE may return, to the originating UE, a 183 message that does not include a "precondition" field, or the terminating UE directly returns a 180 message. For details, refer to embodiments shown in FIG. 3 and FIG. 4A and FIG. 4B. Details are not described herein again.

204. The media server sends a first response message specific to the second call request message to the network device.

The first response message may be specifically a 183 message. The first response message is used to respond to a call request message of the originating UE. Because the media server receives the second call request message, and the second call request message is obtained based on the first call request message, it may be considered that the first response message is used to respond to the second call request message.

The first response message indicates that negotiation about the first media is not performed between the terminating UE and the originating UE through a resource reservation mechanism/procedure. Specifically, the first response message does not include a "precondition" field, for example, neither a "Supported" header field nor a "Require" header field in the first response message includes the "precondition" field. The first response message does not include a QoS parameter.

Session description protocol (SDP) information included in the first response message may be SDP information of the terminating UE, for example, is determined based on a 183 message sent by the terminating UE; or may be SDP information of the media server or fictitious SDP information of the media server. For example, the media server determines that the 183 message sent by the terminating UE is not received before a 180 message sent by the terminating UE is received. Therefore, the media server constructs the first response message to respond to the first call request message of the originating UE. This is not limited in this embodiment of this application.

205. The network device forwards the first response message to the originating UE.

The originating UE may determine, according to the first response message, that negotiation about the first media is not performed between the originating UE and the terminating UE through a resource reservation mechanism/procedure. Because negotiation about the first media is not performed through a resource reservation mechanism/procedure, the originating UE does not need to perform resource reservation for the first media, to notify the terminating UE of resource reservation completion status, or to confirm a resource reservation completion status of the terminating UE, so that no network resources are occupied, and a call delay can also be reduced.

206. The media server completes resource reservation for the second media.

The media server may first determine to play the second media for the originating UE. Specifically, the media server queries, by using an HSS, whether a caller and a callee subscribe to a service of playing the second media for the originating UE, to determine whether to play the second media for the originating UE. The media server may determine, based on a case in which either parry subscribes to the service of playing the second media for the originating UE, to play the second media for the originating UE.

In addition, the media server determines content of the played second media based on information about the originating UE that is obtained through a CSCF device or the HSS, for example, a calling/called number, a network to which the originating UE belongs, an attribute label such as an age, a sex, a user credit level, an internet access habit, or a consumption behavior of the caller, or a current real-time location of the caller and time.

In an optional manner, the media server indicates an MRF device to perform resource reservation for the second media. In addition, when the media server includes a function of the MRF device, the media server performs resource reservation for the second media.

An execution sequence of step 206 is optional. For example, after determining, in step 202, that the resource reservation mechanism/procedure is supported, the media server may start to perform resource reservation for the second media, or step 206 is performed after step 207. This is not limited in this application.

207. The media server sends a first update message to the network device.

The first update message may be specifically an UPDATE message. The first update message is used to negotiate with the originating UE about the second media. The first update message includes SDP of audio/video of the media server, and the SDP of audio/video of the media server is specifically session description protocol SDP information of the media server. The SDP information may be based on information provided by the MRF device. The first update message further includes third indication information indicating that negotiation about the second media is performed through a resource reservation mechanism/procedure. The SDP of audio/video is audio and/or video capability description information.

The network device may determine, according to the third indication information, that negotiation performed by using the resource reservation mechanism/procedure is about the second media, and therefore does not delete or modify indication information related to use of the resource reservation mechanism/procedure.

In an optional manner, the third indication information may include sixth indication information indicating that the SDP of audio/video is related to the second media and seventh indication information indicating that the resource reservation mechanism/procedure is used.

The sixth indication information may include a "g.3gpp.cat" field. The field is used to indicate that the SDP information or current negotiation is related to the second media. The seventh indication information may include that a "Supported" or "Require" header field includes a "precondition" field, to indicate that the current negotiation is performed through a resource reservation mechanism/procedure. Alternatively, the seventh indication information may include a quality of service (QoS) parameter such as a "des:qos optional remote sendrecv" field, to indicate that the current negotiation is performed through a resource reservation mechanism/procedure.

The network device may determine, according to the sixth indication information, that the SDP information is used for negotiation about the second media, and therefore does not delete the "precondition" field in the "Supported" or "Require" header field in the first update message, in other words, does not delete the seventh indication information.

In an optional manner, the third indication information may be alternatively that a second header field includes the first field. For example, a "PX" header field or a "P_EN-ABLE" header field includes a "precondition" field. Alternatively, the third indication information may be that a first header field includes the second field. For example, a "Supported" header field includes a "px" field or a "p_enable" field.

In an optional manner, step 206 has been performed before step 207, in other words, the media server has completed resource reservation before step 207, and in this case, the first update message may further include eighth indication information indicating that the media server has completed resource reservation for the second media, for example, QoS parameters of an audio description and a video description include "a=curr:qos local sendrecv". If step 206 has not been performed before step 207, the media server may send, after step 206 is performed, an UPDATE message including the eighth indication information to the originating UE through the network device; or may add the eighth indication information to a second update message in step 216.

208. The network device forwards the first update message to the originating UE.

The originating UE determines the SDP of audio/video of the media server according to the first update message, and then determines, based on an audio/video capability of the originating UE, a result of negotiation with the media server about the second media, namely, SDP of audio/video of the originating UE. The SDP of audio/video of the originating UE may be specifically SDP information of the originating UE.

The originating UE may further determine, according to the third indication information included in the first update message, that negotiation about the second media is performed through a resource reservation mechanism/procedure. Specifically, the originating UE may perform the determining based on the "precondition" field included in the "Supported" or "Require" header field. The originating UE may also start to perform resource reservation for the second media.

The originating UE may further determine, according to the eighth indication information included in the first update message, that the media server has completed resource reservation for the second media.

The following steps include two optional manners. One manner is step 209 to step 212. The originating UE completes resource reservation, and then sends a second response message specific to the first update message to the media server, and the media server plays the second media for the originating UE. The other manner is step 213 to step 220. The originating UE has not completed resource reservation. The originating UE first sends a third response message specific to the first update message to the media server to transmit the negotiation result of the second media. After completing resource reservation, the originating UE further sends the second update message to the media server to notify the media server that the originating UE has completed resource reservation, and the media server plays the second media for the originating UE. Specific steps are as follows.

Manner 1:

209. The originating UE completes resource reservation for the second media.

210-211. The originating UE sends the second response message specific to the first update message to the media server through the network device.

The second response message may be specifically a 200 OK message, and is used to respond to the first update message.

The second response message includes the SDP of audio/video of the originating UE for the second media, namely, the negotiation result. The second response message further includes ninth indication information indicating that the originating UE has completed resource reservation for the second media, for example, QoS parameters of an audio description and a video description include "a=curr:qos local sendrecv".

The second response message may further include indication information indicating that negotiation about the second media is performed through a resource reservation mechanism/procedure. Specific content is similar to that of the third indication information included in the first update message in step 207. Details are not described herein again.

212. The media server plays the second media for the originating UE.

The media server receives the second response message, and determines that both parties have completed resource reservation for the second media, and the media server plays the second media for the originating UE.

Specifically, the media server sends an audio stream and/or a video stream of the second media to the originating UE, or the media server indicates the MRF device to send an audio stream and/or a video stream of the second media to the originating UE.

Manner 2:

213-214. The originating UE sends the third response message specific to the first update message to the media server through the network device.

The third response message may be specifically a 200 OK message, and is used to respond to the first update message. The third response message includes the SDP of audio/video of the originating UE for the second media. In this case, the originating UE has not completed resource reservation. Therefore, the third response message does not include ninth indication information indicating that the originating UE has completed resource reservation for the second media, or the third response message includes tenth indication information indicating that the originating UE has not completed resource reservation for the second media, for example, a QoS parameter "a=curr:qos local none".

The third response message may further include indication information indicating that negotiation about the second media is performed through a resource reservation mechanism/procedure. Specific content is similar to that of the third indication information included in the first update message in step 207. Details are not described herein again.

The media server determines, according to the third response message, that the originating UE has not completed resource reservation, and therefore temporarily does not play the second media for the originating UE.

215. The originating UE completes resource reservation for the second media.

216-217. The originating UE sends the second update message to the media server through the network device.

The second update message may be specifically an UPDATE message, and is used to notify the media server that the originating UE has completed resource reservation for the second media. Specifically, the second update message may include eleventh indication information indicating that the originating UE has completed resource reservation for the second media, for example, a QoS parameter "a=curr:qos local sendrecv".

218-219. The media server sends a fourth response message specific to the second update message to the originating UE through the network device.

The fourth response message may be a 200 OK message, and is used to respond to the second update message.

220. The media server plays the second media for the originating UE.

For details, refer to the descriptions in step 212. In addition, a time sequence of step 220 and steps 218-219 is not limited.

It should be understood that a subsequent step may further include content, for example, the callee answers the call, the originating UE and the terminating UE are performing a call, the callee hangs up, the second media continues to be played, or play of the second media ends. A person skilled in the art is quite familiar with this, and details are not described herein.

In this embodiment of this application, the first call request message sent by the originating UE indicates that the resource reservation mechanism/procedure is supported, and the network device is configured as not supporting use of the resource reservation mechanism/procedure for negotiation about the first media and supporting use of the resource reservation mechanism/procedure for negotiation about the second media. The network device sends the second call request message to the media server based on the first call request message. The second call request message indicates that use of the resource reservation mechanism/procedure for negotiation about the first media is not supported and use of the resource reservation mechanism/procedure for negotiation about the second media is supported. Further, negotiation about the second media is performed between the media server and the originating UE through a resource reservation mechanism/procedure, and negotiation about the first media is not performed between the originating UE and the terminating UE through a resource reservation mechanism/procedure. In this embodiment of this application, when use of the resource reservation mechanism/procedure for negotiation about the first media is not supported, resource negotiation is performed on the second media by using the resource reservation mechanism/procedure, so that the second media is played for the originating UE, thereby enriching user experience, increasing network capability utilization, and facilitating development of a service related to the second media (for example, video ring back tone).

In addition, because negotiation about the first media is not performed between the originating UE and the terminating UE through a resource reservation mechanism/procedure, pressure exerted on the network is relieved, and a call connection is not affected.

Figure 3:
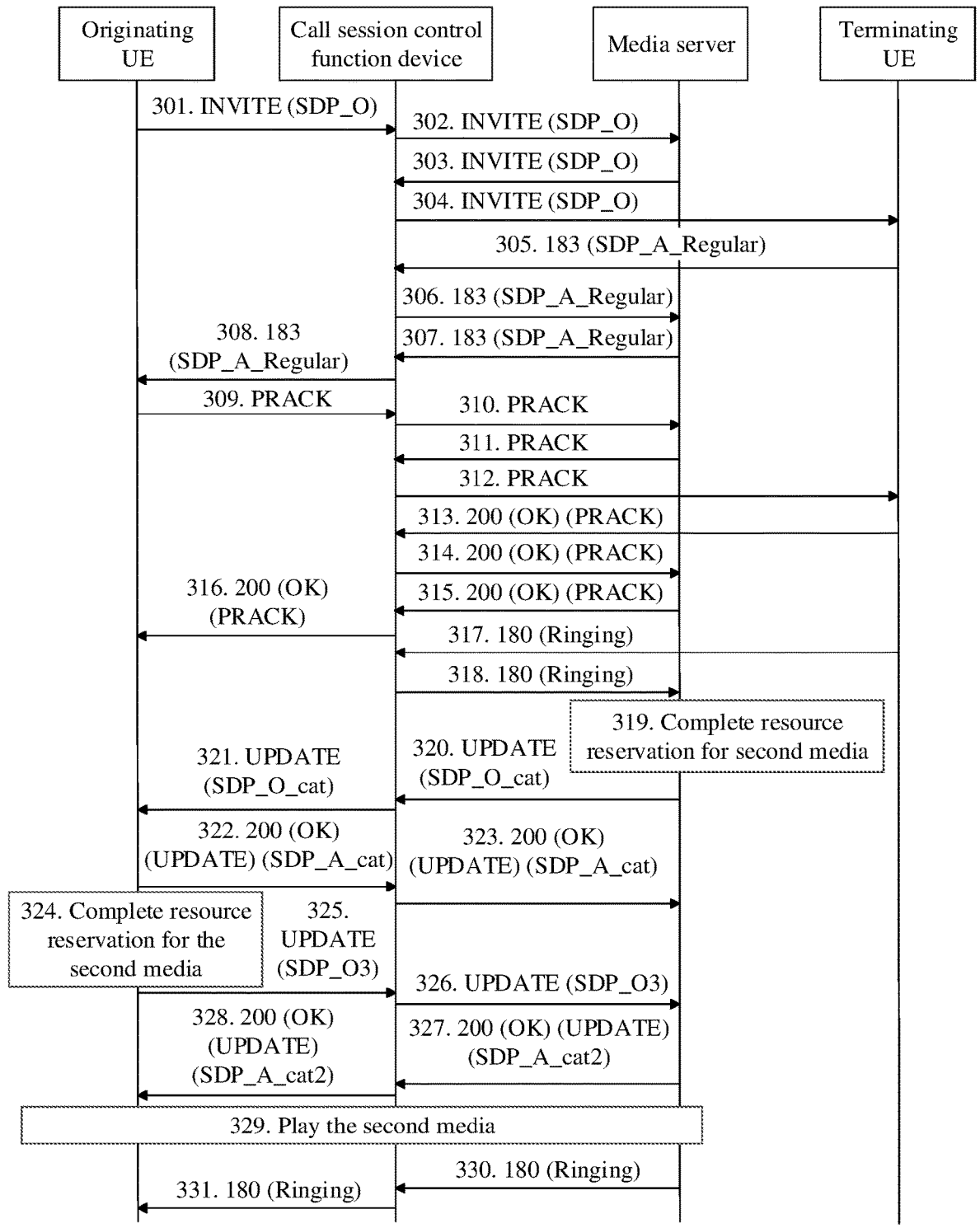
FIG. 3 is a flowchart of another call processing method according to an embodiment of this application.

FIG. 3 is a schematic flowchart of a call processing method 300 according to this application. The method 300 may be applied to the system shown in FIG. 1, or certainly may be applied to another communications scenario. This is not limited in this embodiment of this application. FIG. 3 describes the method of this application by using example signaling, and an example in which a network device in FIG. 3 is a CSCF device is used for description. Specifically, the CSCF device may be a P-CSCF device, an S-CSCF device, or an I-CSCF device. The method shown in FIG. 3 is an example of the method shown in FIG. 2. Therefore, for some explanations of the method shown in FIG. 3, refer to the method shown in FIG. 2. Specific steps are as follows.

301. The CSCF device receives a first call request message, for example, an INVITE message, sent by an originating UE.

The first call request message includes SDP information (SDP_O) of the originating UE, and the SDP information of the originating UE is used by the originating UE and a terminating UE to negotiate about first media. In addition, the first call request message includes first indication information indicating that a resource reservation mechanism/procedure is supported.

For example, the first call request message includes the following content:

---
301. INVITE (SDP_O)
---

INVITE tel:+1-212-555-2222 SIP/2.0
Via: SIP/2.0/UDP [5555::aaa:bbb:ccc:ddd]:1357;comp=sigcomp;branch=z9hG4bKnashds7
   Max-Forwards: 70
   Route: <sip:pcscf1.visited1.net:7531;lr;comp=sigcomp>, <sip:scscf1.home1.net;lr>
   P-Preferred-Identity: "John Doe" <sip:user1_public1@home1.net>
P-Access-Network-Info: 3GPP-UTRAN-TDD; utran-cell-id-3gpp=234151D0FCE11
   P-Preferred-Service: urn:urn-7:3gpp-service.ims.icsi.mmtel
   Accept-Contact: *;+g.3gpp.icsi_ref="urn%3Aurn-7%3gpp-service.ims.icsi.mmtel"
   Privacy: none
   P-Early-Media: supported
   From: <sip:user1_public1@home1.net>;tag=171828
   To: <tel:+1-212-555-2222>
   Call-ID: cb03a0s09a2sdfglkj490333
   Cseq: 127 INVITE
   Recv-Info: infoDtmf
   Supported: precondition, 100rel, gruu, 199
   Proxy-Require: sec-agree
   Security-Verify: ipsec-3gpp; q=0.1; alg=hmac-sha-1-96; spi-c=98765432; spi-s=87654321; port-c=8642; port-s=7531
   Contact: <sip: user1_public1@home1.net;gr=urn:uuid:f81d4fae-7dec-11d0-a765-00a0c91e6bf6>;+g.3gpp.icsi-ref="urn%3Aurn-7%3gpp-service.ims.icsi.mmtel"
   Allow: INVITE, ACK, CANCEL, BYE, PRACK, UPDATE, REFER, MESSAGE
   Accept:application/sdp, application/3gpp-ims+xml
   Content-Type: application/sdp
   Content-Length: (...)

---

Supported: precondition is the first indication information. The CSCF device determines, according to the first indication information, that the resource reservation mechanism/procedure is supported. Specifically, the CSCF device determines, according to the first indication information, that the originating UE supports the resource reservation mechanism/procedure.

For example, the CSCF device stores the following first configuration information: CLSPRECND-CALL=Y, and CLSPRECND-CAT=N. CLSPRECND-CALL is a control bit indicating whether to disable the resource reservation mechanism/procedure for negotiation about the first media. When CLSPRECND-CALL is set to "Y", it indicates to disable the resource reservation mechanism/procedure, in other words, use of the resource reservation mechanism/procedure for negotiation about the first media is not supported. CLSPRECND-CAT is a control bit indicating whether to disable the resource reservation mechanism/procedure for negotiation about second media. When CLSPRECND-CAT is set to "N", it indicates not to disable the resource reservation mechanism/procedure, in other words, a network supports use of the resource reservation mechanism/procedure for negotiation about the second media. The CSCF device determines, according to the configuration, that use of the resource reservation mechanism/procedure for negotiation about the first media is not supported and use of the resource reservation mechanism/procedure for negotiation about the second media is supported.

For other content, refer to step 201. Details are not described herein again.

302. The CSCF device sends a second call request message such as an INVITE message to a media server, where the second call request message indicates that use of the resource reservation mechanism/procedure for negotiation about the first media is not supported and use of the resource reservation mechanism/procedure for negotiation about the second media is supported.

For example, the second call request message includes the following content:

---
302. INVITE (SDP_O)
---

INVITE tel:+1-212-555-2222 SIP/2.0
Via: SIP/2.0/UDP [5555::aaa:bbb:ccc:ddd]:1357;comp=sigcomp;branch=z9hG4bKnashds7
   Max-Forwards: 70
   Route: <sip:pcscf1.visited1.net:7531;lr;comp=sigcomp>, <sip:scscf1.home1.net;lr>
   P-Preferred-Identity: "John Doe" <sip:user1_public1@home1.net>
   P-Access-Network-Info: 3GPP-UTRAN-TDD; utran-cell-id-3gpp=234151D0FCE11
   P-Preferred-Service: urn:urn-7:3gpp-service.ims.icsi.mmtel
   Accept-Contact: *;+g.3gpp.icsi_ref="urn%3Aurn-7%3gpp-service.ims.icsi.mmtel"

| 302. INVITE (SDP_O) |
| --- |

Privacy: none
P-Early-Media: supported
From: <sip:user1_public1@home1.net>;tag=171828
To: <tel:+1-212-555-2222>
Call-ID: cb03a0s09a2sdfglkj490333
Cseq: 127 INVITE
Recv-Info: infoDtmf
Supported: 100rel, gruu, 199
PX:precondition
Proxy-Require: sec-agree
Security-Verify: ipsec-3gpp; q=0.1; alg=hmac-sha-1-96; spi-c=98765432; spi-s=87654321; port-c=8642; port-s=7531
Contact: <sip: user1_public1@home1.net;gr=urn:uuid:f81d4fae-7dec-11d0-a765-00a0c91e6bf6>;+g.3gpp.icsi-ref="urn%3Aurn-7%3gpp-service.ims.icsi.mmtel"
Allow: INVITE, ACK, CANCEL, BYE, PRACK, UPDATE, REFER, MESSAGE
Accept:application/sdp, application/3gpp-ims+xml
Content-Type: application/sdp
Content-Length: (...)

The CSCF device modifies the first call request message into the second call request message based on the case in which the resource reservation mechanism/procedure is supported and the first configuration information. Specifically, the CSCF device deletes a "precondition" field included in a "Supported" header field of the first call request message, inserts a second header field "PX", and inserts a "precondition" field into the second header field "PX". Alternatively, the CSCF device deletes a "precondition" field included in a "Supported" header field of the first call request message, inserts a second header field "Precondition-Enable", and inserts a second field cat into the second header field "Precondition-Enable". Therefore, the second call request message may indicate that use of the resource reservation mechanism/procedure for negotiation about the first media is not supported and use of the resource reservation mechanism/procedure for negotiation about the second media is supported. For detailed content, refer to step 202. Details are not described herein again.

303-304. The media server receives the second call request message, and forwards the second call request message to the terminating UE.

For detailed content, refer to step 202 and step 203.

305-306. The media server receives, through the CSCF device, a 183 message sent by the terminating UE.

The terminating UE determines that negotiation about the first media is not performed with the originating UE through a resource reservation mechanism/procedure. Specifically, the terminating UE may perform the determining based on a case in which a "Supported" header field and a "Require" header field in the second call request message do not include a "precondition" field or a case in which the second call request message does not include a QoS parameter. In this case, regardless of whether the terminating UE supports the resource reservation mechanism/procedure, negotiation about the first media is not performed with the originating UE through a resource reservation mechanism/procedure. In addition, the terminating UE may not support the resource reservation mechanism/procedure, either.

The 183 message is used to respond to the foregoing INVITE message. The 183 message includes SDP information (SDP_A_Regular) of the terminating UE, and the SDP information of the terminating UE is used by the terminating UE and the originating UE to negotiate about the first media. In addition, the 183 message indicates that negotiation about the first media is not performed between the originating UE and the terminating UE through a resource reservation mechanism/procedure. Specifically, neither a "Supported" header field nor a "Require" header field in the 183 message includes a "precondition" field, and/or the 183 message does not include a QoS parameter.

307-308. The media server forwards the 183 message to the originating UE through the CSCF device.

For details, refer to step 204 and step 205.

309-310. The originating UE sends an acknowledgment (PRACK) message to the media server through the CSCF device, to indicate that the 183 message is received.

311-312. The media server forwards the PRACK message to the terminating UE through the CSCF device.

313-314. The terminating UE sends a 200 OK message to the media server through the CSCF device, to indicate that the PRACK message is received.

315-316. The media server forwards the 200 OK message to the originating UE through the CSCF device.

317-318. The terminating UE sends a 180 message to the media server through the CSCF device, to indicate that the terminating UE is ringing.

319. The media server completes resource reservation for the second media.

For details, refer to the descriptions in step 206.

320. The media server sends a first update message (for example, an UPDATE message) to the CSCF device.

The first update message includes SDP information (for example, SDP_O_cat) of the media server, and the SDP information of the media server is used by the media server and the originating UE to negotiate about the second media.

For example, the first update message includes the following content:

---
320. UPDATE (SDP_O_Cat)
---

UPDATE sip:user1_public1@home1.net;gr=urn:uuid:f81d4fae-7dec-11d0-a765-00a0c91e6bf6 SIP/2.0
...
   Supported: precondition              /*Use/Support the resource reservation mechanism/procedure
   P-Early-Media: sendrecv      /*Early media
   v=0
   o=- 29879336156 29879336156 IN IP6 5555::ccc:aaa:abc:abc
   s=-
   c=IN IP6 5555::ccc:aaa:abc:abc
   t=0 0
   m=video 51372 RTP/AVPF 98 /*Start to describe video media information
     a=acfg:1 t=1
     b=AS:75
     a=curr:qos local sendrecv       /*The local end has completed resource reservation
     a=curr:qos remote none      /*The remote end has not completed resource reservation
     a=des:qos mandatory local sendrecv     /*Desire to complete resource reservation at the local end
     a=des:qos optional remote sendrecv     /*Desire to complete resource reservation at the remote end
     a=conf:qos remote sendrecv     /*Need to confirm whether the remote end has completed resource reservation
     a=rtpmap:98 H263
     a=fmtp:98 profile-level-id=0
     a=content:g.3gpp.cat       /*The video media information is related to the second media
   m=audio 49170 RTP/AVPF 97 96     /*Start to describe audio media information
     a=acfg:1 t=1
     b=AS:25.4
     a=curr:qos local sendrecv      /*The local end has completed resource reservation
     a=curr:qos remote none     /*The remote end has not completed resource reservation
     a=des:qos mandatory local sendrecv     /*Desire to complete resource reservation at the local end
     a=des:qos optional remote sendrecv     /*Desire to complete resource reservation at the remote end
     a=conf:qos remote sendrecv     /*Need to confirm whether the remote end has completed resource reservation
     a=rtpmap:97 AMR
     a=fmtp:97 mode-set=0,2,5,7; maxframes
     a=rtpmap:96 telephone-event
     a=content: g.3gpp.cat      /*The audio media information is related to the second media

---

For details, refer to the descriptions in step 207.

321. The CSCF device forwards the first update message to the originating UE.

For details, refer to the descriptions in step 208.

The following steps include two optional manners. For details, refer to the descriptions in the embodiment shown in FIG. 2. Manner 1 is described as an example in this embodiment of this application. Specific steps are as follows.

322-323. The originating UE sends a third response message (for example, a 200 OK message) specific to the first update message to the media server through the CSCF device.

The third response message includes SDP information (for example, SDP_A_cat) of the originating UE, and the SDP information of the originating UE is used by the media server and the originating UE to negotiate about the second media. For detailed content, refer to step 213 and step 214.

324. The originating UE completes resource reservation for the second media.

325-326. The originating UE sends a second update message (for example, an UPDATE message) to the media server through the CSCF device.

The second update message includes SDP information (for example, SDP_O3) of the originating UE, and the SDP information of the originating UE is used to indicate that the originating UE has completed resource reservation for the second media. For example, the SDP information includes a QoS parameter "a=curr:qos local sendrecv". For details, refer to step 216 and step 217.

327-328. The media server sends a fourth response message (for example, a 200 OK message) specific to the second update message to the originating UE through the CSCF device.

The fourth response message is used to respond to the second update message.

329. The media server plays the second media for the originating UE.

For details, refer to the descriptions in step 212 and step 220.

330-331. The media server sends a 180 message to the terminating UE through the CSCF device.

It should be understood that a time sequence of steps 330-331 and step 329 is not limited.

It should be understood that a subsequent step may further include content, for example, a callee answers a call, the originating UE and the terminating UE are performing a call, the callee hangs up, the second media continues to be played, or play of the second media ends. A person skilled in the art is quite familiar with this, and details are not described herein.

It should be noted that step 319 to step 329 may be performed before step 317, in other words, a process of negotiating about the second media between the media server and the originating UE and then playing the second media, and a process of paging the terminating UE and waiting for the terminating UE to ring happen simultaneously, so that the second media can be played as soon as a called number is dialoged, play time of the second media can be prolonged, and user experience can be enhanced.

Figure 4A:
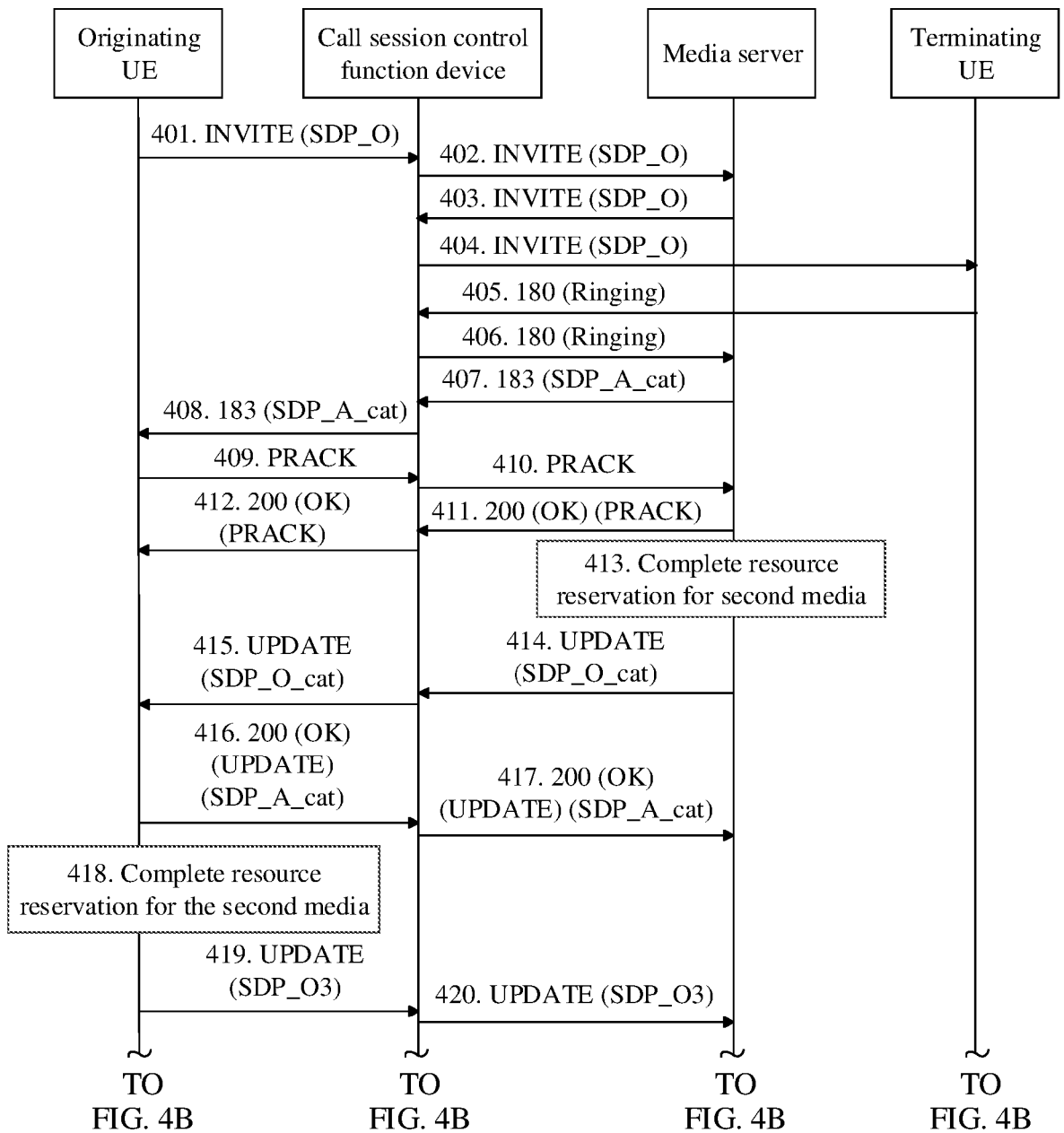
FIG. 4A and FIG. 4B are a flowchart of still another call processing method according to an embodiment of this application.
Figure 4B:
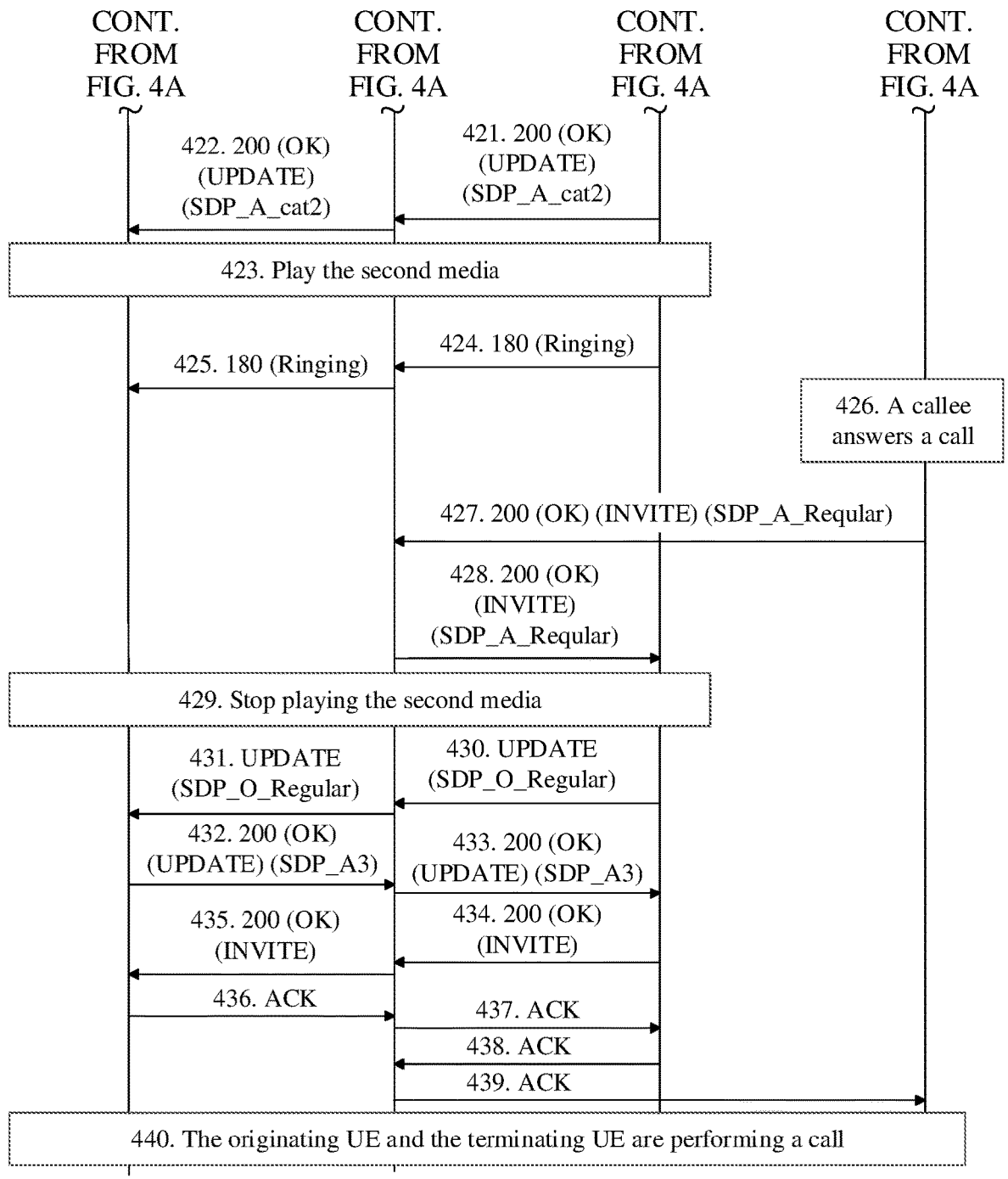

FIG. 4A and FIG. 4B are a schematic flowchart of a call processing method 400 according to this application. The method 400 may be applied to the system shown in FIG. 1, or certainly may be applied to another communications scenario. This is not limited in this embodiment of this application. FIG. 4A and FIG. 4B describe the method of this application by using example signaling, and an example in which a network device in FIG. 4A and FIG. 4B is a CSCF device is used for description. Specifically, the CSCF device may be a P-CSCF device, an S-CSCF device, or an I-CSCF device. The method shown in FIG. 4A and FIG. 4B is an example of the method shown in FIG. 2. Therefore, for some explanations of the method shown in FIG. 4A and FIG. 4B, refer to the method shown in FIG. 2. A difference between the embodiment shown in FIG. 4A and FIG. 4B and the embodiment shown in FIG. 3 lies in that a terminating UE in FIG. 4A and FIG. 4B does not support a resource reservation mechanism/procedure, and does not return a 183 message, but directly returns a 180 message. Specific steps are as follows.

For step 401 to step 404, refer to step 301 to step 304. Details are not described herein again.

405-406. The terminating UE sends a 180 message to the media server through the CSCF device, to indicate that the terminating UE is ringing.

The media server determines, based on a case in which a 183 message is not received before the 180 message sent by the terminating UE is received, that the terminating UE does not support the resource reservation mechanism/procedure. For example, the terminating UE accesses a fixed network or a 2/3G network, or the terminating UE is a software terminal corresponding to application software with a call function. Negotiation about the first media is not performed between the terminating UE and the originating UE through a resource reservation mechanism/procedure.

407-408. The media server sends a first response message (for example, a 183 message) specific to the second call request message to the originating UE through the CSCF device.

The first response message is constructed by the media server, and the first response message may include SDP information of the media server, or include fictitious SDP information. The SDP information included in the first response message is used to respond to the SDP information of the originating UE in the INVITE message in step 401 and step 402. The first response message is used to respond to a call request message of the originating UE. Because the media server receives the second call request message, and the second call request message is generated based on the first call request message, it may be considered that the first response message is used to respond to the second call request message.

If a call initiated by the originating UE in step 401 is a video call, the first call request message and the second call request message include SDP information of audio media and SDP information of video media. There are the following two manners.

Manner 1: The SDP information in the first response message may include the SDP information of the audio media and/or the video media, and the SDP information may be fictitious or may be about the media server. In addition, the first response message indicates that negotiation about the first media is not performed between the terminating UE and the originating UE through a resource reservation mechanism/procedure.

Manner 2: The first response message may include SDP information of the media server for negotiation about the second media (the audio media and the video media). The SDP information in the first response message is used by the media server and the originating UE to negotiate about the second media. In addition, the first response message indicates that negotiation about the second media is performed between the media server and the originating UE through a resource reservation mechanism/procedure.

Specifically, the first response message includes a "g.3gpp.cat" field. The field is used to indicate that the SDP information or current negotiation is related to the second media. The first response message may further include a "precondition" field in a "Supported" or "Require" header field, to indicate that the current negotiation is performed through a resource reservation mechanism/procedure. Alternatively, third indication information in the first response message may further include a quality of service (QoS) parameter such as a "des:qos optional remote sendrecv" field, to indicate that the current negotiation is performed through a resource reservation mechanism/procedure. The CSCF device may determine, based on the "g.3gpp.cat" field, that the SDP information is used for negotiation about the second media, and therefore does not delete the "precondition" field included in the "Supported" or "Require" header field.

In an optional manner, the media server starts to perform resource reservation for the second media, for example, indicates an MRF device to perform resource reservation for the second media, and the media server has not completed resource reservation for the second media. In this case, the first response message may further include indication information indicating that the media server has not completed resource reservation for the second media, for example, QoS parameters or a QoS parameter of an audio description and/or a video description include or includes "a=curr:qos local none". Further, after completing resource reservation for the second media, the media server sends an UPDATE message to the originating UE to notify the originating UE that the media server has completed resource reservation.

In an optional manner, the media server has completed resource reservation for the second media. In this case, the first response message may further include indication information indicating that the media server has completed resource reservation for the second media. For example, QoS parameters of an audio description and a video description include "a=curr:qos local sendrecv".

For example, the first response message includes the following content:

---
407-408(1). 183 Session Progress (SDP_A_Cat)
---

SIP/2.0 183 Session Progress
...
Require: 100rel, early-session
Supported: precondition            /*Use/Support the resource reservation mechanism/procedure
...
Content-Disposition: early-session
P-Early-Media: sendrecv
v=0
o=- 29879336156 29879336156 IN IP6 5555::ccc:aaa:abc:abc
s=-
c=IN IP6 5555::ccc:aaa:abc:abc
t=0 0
  m=audio 49170 RTP/AVPF 97 96            /*Start to describe audio media information
    a=acfg: 1 t=1
    b=AS:25.4
    a=curr:qos local sendrecv           /*The local end has completed resource reservation
    a=curr:qos remote none         /*The remote end has not completed resource reservation
    a=des:qos mandatory local sendrecv       /*Desire to complete resource reservation at the local end
    a=des:qos optional remote sendrecv        /*Desire to complete resource reservation at the remote end
    a=conf:qos remote sendrecv
    a=rtpmap:97 AMR
    a=fmtp:97 mode-set=0,2,5,7; maxframes
    a=rtpmap:96 telephone-event
    a=content:g.3gpp.cat            /*The audio media information is related to the second media
  m=video 51372 RTP/AVPF 98             /*Start to describe video media information
    a=acfg: 1 t=1
    b=AS:75
    a=curr:qos local sendrecv           /*The local end has completed resource reservation
    a=curr:qos remote none  /*The remote end has not completed resource reservation
    a=des:qos mandatory local sendrecv       /*Desire to complete resource reservation at the local end
    a=des:qos optional remote sendrecv        /*Desire to complete resource reservation at the remote end
    a=conf:qos remote sendrecv
    a=rtpmap:98 H263
    a=fmtp:98 profile-level-id=0
    a=content:g.3gpp.cat           /*The video media information is related to the second media

---

It should be noted that step 414 to step 417 may not be performed because the SDP information in the first response message is a negotiation result of the second media between the media server and the originating UE.

If a call initiated by the originating UE in step 401 is an audio call, the first call request message and the second call request message include SDP information of audio media, and do not include SDP information of video media. The SDP information in the first response message also includes the SDP information of the audio media, but does not include the SDP information of the video media. In addition, the first response message indicates that negotiation about the first media is not performed through a resource reservation mechanism/procedure. Specifically, the first response message does not include a "precondition" field. Neither a "Supported" header field nor a "Require" header field in the first response message includes a "precondition" field. If the second media is the audio media, and does not include the video media, there are also two manners in this scenario. Manner 1: The SDP information in the first response message includes the SDP information of the audio media, and the SDP information may be fictitious or may be about the media server. Manner 2: The first response message may include SDP information of the media server for negotiation about the second media (the audio media). For details, refer to the descriptions in the foregoing two manners. Details are not described herein again.

For example, the first response message includes the following content:

---
407-408(2). 183 Session Progress (SDP_A_Cat)
---

SIP/2.0 183 Session Progress
...
Require: 100rel, early-session
Content-Disposition: early-session
Content-Length: (...)
v=0
o=- 2987933616 2987933616 IN IP6 5555::eee:fff:aaa:bbb
s=-
c=IN IP6 5555::ccc:aaa:bbb:acc
t=0 0
m=audio 3456 RTP/AVP 97
b=AS:25.4
a=rtpmap:97 AMR

| 407-408(2). 183 Session Progress (SDP_A_Cat) |
|---|
| a=fmtp:97 mode-set=0,2,5,7; maxframes<br>a=content:g.3gpp.cat |

409-410. The originating UE sends an acknowledgment (PRACK) message to the media server through the CSCF device, to indicate that the 183 message is received.

411-412. The media server sends a 200 OK message to the originating UE through the CSCF device, to indicate that the PRACK message is received.

413. The media server completes resource reservation for the second media.

For details, refer to the descriptions in step 206.

In addition, in this embodiment of this application, the media server may alternatively start to perform resource reservation for the second media in step 407. This is not limited in this application.

For step 414 to step 425, refer to step 320 to step 331. Details are not described herein again.

It should be noted that step 407 to step 423 may be performed before step 405, in other words, a process of negotiating about the second media between the media server and the originating UE and then playing the second media, and a process of paging the terminating UE and waiting for the terminating UE to ring happen simultaneously, so that the second media can be played as soon as a called number is dialoged, play time of the second media can be prolonged, and user experience can be enhanced.

It should be understood that a subsequent step may further include content, for example, a callee answers the call, the originating UE and the terminating UE are performing a call, the callee hangs up, the second media continues to be played, or play of the second media ends. A person skilled in the art is quite familiar with this, and details are not described herein. The following briefly describes an example in which the callee answers the call and the originating UE and the terminating UE are performing a call. There is another implementation solution. This is not limited in this application.

426. The callee answers the call.

427-428. The media server receives a fifth response message (for example, a 200 OK (INVITE) message) that corresponds to the second call request message (for example, an INVITE message) and that is sent by the terminating UE through the CSCF device.

The fifth response message specific to the second call request message indicates that the callee has answered the call. In addition, the fifth response message includes media capability description information of the terminating UE, namely, SDP information of the terminating UE. The fifth response message does not include a "precondition" field, to indicate that negotiation about the first media is not performed through a resource reservation mechanism/procedure. Specifically, neither a "Supported" header field nor a "Require" header field in the fifth response message includes a "precondition" field.

429. The media server stops playing the second media for the originating UE.

Specifically, the media server stops sending an audio/video stream of the second media to the originating UE, or the media server indicates the MRF device to stop sending an audio/video stream of the second media to the originating UE.

430-431. The media server sends a third update message (for example, an UPDATE message) to the originating UE through the CSCF device.

The third update message is used to negotiate with the originating UE about the first media. The third update message includes media capability description information of the terminating UE. The third update message does not include a "precondition" field, to indicate that negotiation about the first media is not performed through a resource reservation mechanism/procedure. Specifically, neither a "Supported" header field nor a "Require" header field in the third update message includes a "precondition" field.

432-433. The media server receives a sixth response message (for example, a 200 OK (UPDATE) message) sent by the originating UE through the CSCF device.

The originating UE determines, according to the third update message, that negotiation about the first media is not performed through a resource reservation mechanism/procedure. The sixth response message is used to respond to the third update message. The sixth response message includes media capability information of the originating UE, namely, SDP information of the originating UE.

434-435. The media server sends a seventh response message (for example, a 200 OK (INVITE) message) specific to the first call request message (for example, an INVITE message) to the originating UE through the CSCF device.

The seventh response message is used to respond to the first call request message.

436-437. The media server receives an eighth response message (for example, an ACK message) sent by the originating UE through the CSCF device. The eighth response message is used to indicate that receipt of the seventh response message is acknowledged.

438-439. The media server sends a ninth response message (for example, an ACK message) to the terminating UE through the CSCF device. The ninth response message is used to indicate that receipt of the fifth response message is acknowledged.

440. The originating UE and the terminating UE are performing a call.

Figure 5:
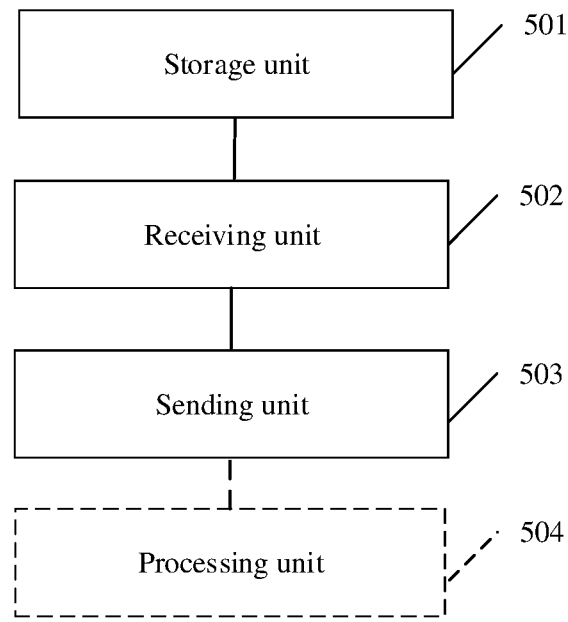
FIG. 5 is a schematic diagram of a structure of a network device according to an embodiment of this application.

An embodiment of this application further provides a schematic diagram of a structure of a network device. As shown in FIG. 5, the network device includes a storage unit 501, a receiving unit 502, and a sending unit 503.

The storage unit 501 is configured to store first configuration information. The first configuration information is that use of a resource reservation mechanism/procedure for negotiation about first media is not supported and use of the resource reservation mechanism/procedure for negotiation about second media is supported.

The receiving unit 502 is configured to receive a first call request message sent by an originating UE. The first call request message includes first indication information indicating that the resource reservation mechanism/procedure is supported.

The sending unit 503 is configured to send a second call request message to a media server based on the first call request message and the first configuration information. Second indication information in the second call request message indicates that use of the resource reservation mechanism/procedure for negotiation about the first media is not supported and use of the resource reservation mechanism/procedure for negotiation about the second media is supported.

The receiving unit 502 is further configured to receive a first update message sent by the media server. The first update message includes SDP of audio/video that is of the media server and that is used for negotiating with the originating UE about the second media and the second indication information, and the second indication information is used to indicate that negotiation about the second media is performed through a resource reservation mechanism/procedure.

The sending unit 503 is further configured to forward the first update message to the originating UE.

The units may be further configured to implement related functions in any one of the foregoing embodiments in FIG. 2 to FIG. 4A and FIG. 4B. Details are not described again.

In an optional manner, the receiving unit 502 is further configured to receive a first response message that corresponds to the second call request message and that is sent by the media server. The first response message indicates that negotiation about the first media is not performed between a terminating UE and the originating UE through a resource reservation mechanism/procedure. The sending unit 503 is further configured to forward the first response message to the originating UE.

In an optional manner, the network device further includes a message processing unit 504, configured to modify the first call request message into the second call request message based on the first configuration information.

In this embodiment, the network device is presented in a form of a functional unit. The "unit" herein may be an application-specific integrated circuit (ASIC), a circuit, a processor and a memory that execute one or more software or firmware programs, an integrated logic circuit, and/or another device that can provide the foregoing functions. In a simple embodiment, a person skilled in the art may figure out that the media server may be implemented by using a processor, a memory, and a communications interface.

Figure 6:
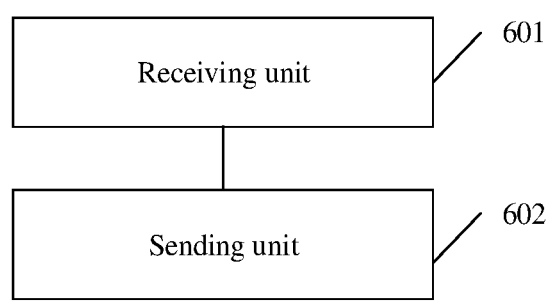
FIG. 6 is a schematic diagram of a structure of a media server according to an embodiment of this application.

An embodiment of this application further provides a schematic diagram of a structure of a media server. As shown in FIG. 6, the media server includes a receiving unit 601 and a sending unit 602.

The receiving unit 601 is configured to receive a second call request message sent by a network device. The second call request message includes second indication information, and the second indication information indicates that use of a resource reservation mechanism/procedure for negotiation about first media is not supported and use of the resource reservation mechanism/procedure for negotiation about second media is supported.

The sending unit 602 is configured to send a first update message to an originating UE. The first update message includes SDP of audio/video that is of the media server and that is used for negotiation about the second media and third indication information, and the third indication information indicates that negotiation about the second media is performed through a resource reservation mechanism/procedure.

The units implement related functions in any one of the foregoing embodiments in FIG. 2 to FIG. 4A and FIG. 4B. Details are not described again.

In an optional manner, the sending unit 602 is further configured to send a first response message specific to the second call request message to the originating UE. The first response message indicates that negotiation about the first media is not performed between terminating UE and the originating UE through a resource reservation mechanism/procedure.

In this embodiment, the media server is presented in a form of a functional unit. The "unit" herein may be an ASIC, a circuit, a processor and a memory that execute one or more software or firmware programs, an integrated logic circuit, and/or another device that can provide the foregoing functions. In a simple embodiment, a person skilled in the art may figure out that the media server may be implemented by using a processor, a memory, and a communications interface.

Figure 8:
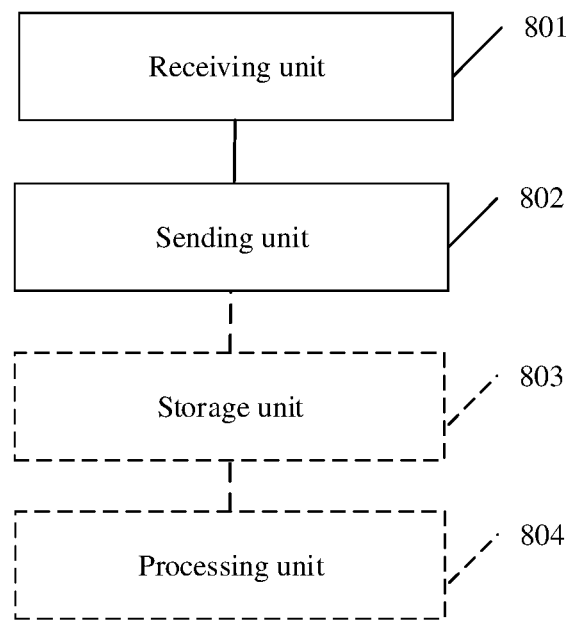
FIG. 8 is a schematic diagram of a structure of still another network device according to an embodiment of this application.

An embodiment of this application further provides a schematic diagram of a structure of a network device. As shown in FIG. 8, the network device includes a receiving unit 801 and a sending unit 802.

The receiving unit 801 is configured to receive a first call request message sent by an originating UE. The first call request message indicates that the originating UE supports a resource reservation mechanism/procedure.

The sending unit 802 is configured to send a second call request message to a media server based on the first call request message. The second call request message indicates that a resource reservation mechanism/procedure for first media is not supported and a resource reservation mechanism/procedure for second media is supported.

The receiving unit 801 is further configured to receive a first update message sent by the media server. The first update message includes SDP of audio/video that is of the media server and that is used for negotiation about the second media, and the first update message indicates that negotiation about the second media is performed through a resource reservation mechanism/procedure.

The sending unit 802 is further configured to forward the first update message to the originating UE.

The units may be further configured to implement related functions in any one of the foregoing embodiments in FIG. 2 to FIG. 4A and FIG. 4B. Details are not described again.

In an optional manner, the network device further includes a storage unit 803, configured to store configuration information that the resource reservation mechanism/procedure for the first media is not supported and the resource reservation mechanism/procedure for the second media is supported.

In an optional manner, the network device further includes a processing unit 804, configured to: delete a first field in a first header field of the first call request message based on the case in which the network device does not support the resource reservation mechanism/procedure for the first media and supports the resource reservation mechanism/procedure for the second media, and insert a second field indicating that a network supports the resource reservation mechanism/procedure for the second media, to obtain the second call request message.

In this embodiment, the network device is presented in a form of a functional unit. The "unit" herein may be an application-specific integrated circuit (ASIC), a circuit, a processor and a memory that execute one or more software or firmware programs, an integrated logic circuit, and/or another device that can provide the foregoing functions. In a simple embodiment, a person skilled in the art may figure out that the media server may be implemented by using a processor, a memory, and a communications interface.

Figure 9:
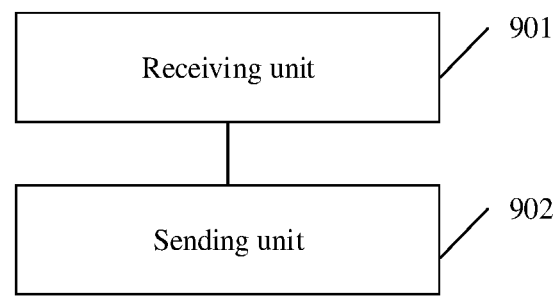
FIG. 9 is a schematic diagram of a structure of still another media server according to an embodiment of this application.

An embodiment of this application further provides a schematic diagram of a structure of a media server. As shown in FIG. 9, the media server includes a receiving unit 901 and a sending unit 902.

The receiving unit 901 is configured to receive a call request message. The call request message is used by an originating UE to initiate a call to a terminating UE, and the call request message indicates that a resource reservation mechanism/procedure for first media is not supported and a resource reservation mechanism/procedure for second media is supported.

The sending unit 902 is configured to send a first update message to the originating UE. The first update message includes SDP of audio/video that is of the media server and that is used for negotiation about the second media, and the first update message indicates that negotiation about the second media is performed through a resource reservation mechanism/procedure.

The units implement related functions in any one of the foregoing embodiments in FIG. 2 to FIG. 4A and FIG. 4B. Details are not described again.

In an optional manner, the sending unit 902 is further configured to forward the call request message to the terminating UE; and the receiving unit 901 is further configured to receive a first response message that corresponds to the call request message and that is sent by the terminating UE. The first response message indicates that negotiation about the first media is not performed through a resource reservation mechanism/procedure.

In this embodiment, the media server is presented in a form of a functional unit. The "unit" herein may be an ASIC, a circuit, a processor and a memory that execute one or more software or firmware programs, an integrated logic circuit, and/or another device that can provide the foregoing functions. In a simple embodiment, a person skilled in the art may figure out that the media server may be implemented by using a processor, a memory, and a communications interface.

Figure 7:
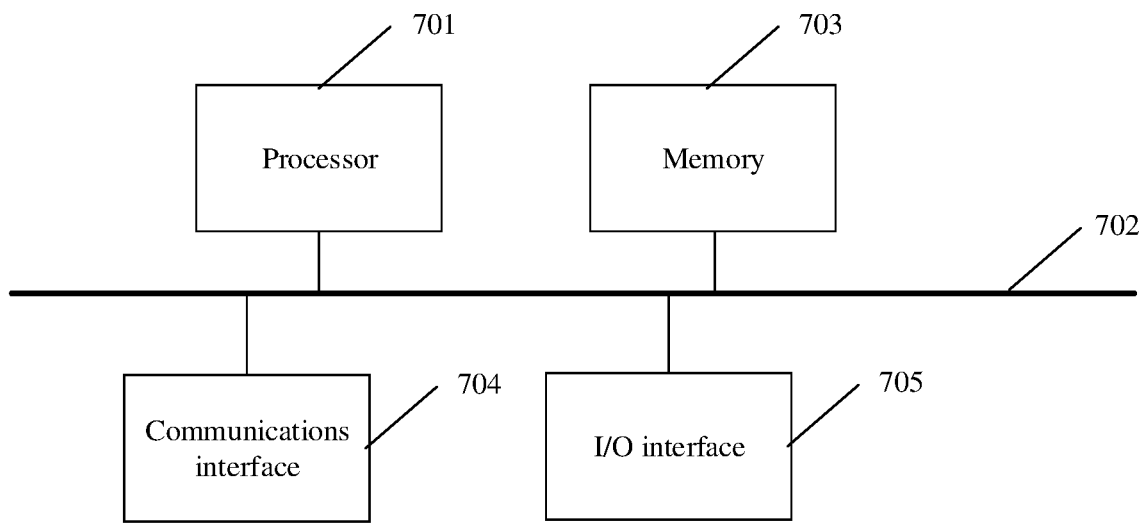
FIG. 7 is a schematic diagram of a structure of another network device or media server according to an embodiment of this application.

The network device or the media server in embodiments of this application may be alternatively implemented in a form of a computer device (or a system) in FIG. 7. FIG. 7 is a schematic diagram of a computer device according to an embodiment of this application. The computer device includes at least one processor 701, communications bus 702, and memory 703, and may further include at least one communications interface 704 and I/O interface 705.

The processor may be a general-purpose central processing unit (CPU), a microprocessor, an application-specific integrated circuit (application-specific integrated circuit, ASIC), or one or more integrated circuits for controlling program execution of the solutions in this application.

The communications bus may include a path in which information is transmitted between the foregoing components. The communications interface is configured to communicate with another device or a communications network such as the Ethernet, a radio access network (RAN), or a wireless local area network (WLAN) by using any apparatus of a transceiver type.

The memory may be a read-only memory (ROM) or another type of static storage device capable of storing static information and instructions, or a random access memory (RAM) or another type of dynamic storage device capable of storing information and instructions; or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blue-ray disc, and the like), a magnetic disk storage medium or another magnetic storage device, or any other medium capable of carrying or storing expected program code in a form of instructions or data structures and capable of being accessed by a computer. This is not limited. The memory may exist independently, and is connected to the processor through a bus. The memory may alternatively be integrated with the processor.

The memory is configured to store application program code for executing the solutions of this application, and the processor controls the execution. The processor is configured to execute the application program code stored in the memory.

In a specific implementation, the processor may include one or more CPUs, and each CPU may be a single-core processor or a multi-core processor. The processor herein may be one or more devices, circuits, and/or processing cores used to process data (for example, computer program instructions).

In a specific implementation, in an embodiment, the computer device may further include an input/output (I/O) interface. For example, an output device may be a liquid crystal display (LCD), a light emitting diode (light emitting diode, LED) display device, a cathode ray tube (CRT) display device, a projector, or the like. An input device may be a mouse, a keyboard, a touchscreen device, a sensing device, or the like.

The computer device may be a general-purpose computer device or a dedicated computer device. In a specific implementation, the computer device may be a desktop computer, a portable computer, a network server, a personal digital assistant (Personal Digital Assistant, PDA), a mobile phone, a tablet computer, a wireless terminal device, a communications device, an embedded device, or a device with a structure similar to that in FIG. 7. A type of the computer device is not limited in this embodiment of this application.

Each of the network devices such as the CSCF device, the SBC device, and the PGW device in FIG. 1 may be the device shown in FIG. 7. The memory stores one or more software modules. The network device may implement the software module by using the processor and the program code in the memory, to complete the method performed by the network device or the CSCF device in the foregoing embodiments.

The media server in FIG. 1 may be the device shown in FIG. 7, and the memory stores one or more software modules. The media server may implement the software module by using the processor and the program code in the memory, to complete the method performed by the media server in the foregoing embodiments.

An embodiment of this application further provides a computer-readable storage medium, configured to store computer software instructions used by the device (the network devices or the media server) shown in FIG. 7. The computer-readable storage medium includes a program designed to execute the foregoing method embodiments. The foregoing methods can be implemented by executing the stored program.

An embodiment of this application further provides a call processing system. The system includes a network device and a media server. The network device may perform any step performed by the network device or the CSCF device in the foregoing embodiments. The media server may perform any step performed by the media server in the foregoing embodiments. Details are not described in this embodiment of this application. In an optional method, the network device may be specifically a CSCF device.

Although this application is described with reference to embodiments, in a process of implementing this application that claims protection, a person skilled in the art may understand and implement another variation of disclosed embodiments by viewing the accompanying drawings, disclosed content, and the appended claims. In the claims, "comprising" does not exclude another component or another step, and "a" or "one" does not exclude a meaning of plurality. A single processor or another module may implement several functions enumerated in the claims. Some measures are recorded in dependent claims that are different from each other, but this does not mean that these measures cannot be combined to produce a better effect.

A person skilled in the art can understand that the functions described with reference to various illustrative logical blocks, modules, and algorithm steps disclosed and described in this specification can be implemented by hardware, software, firmware, or any combination thereof. If software is used for implementation, the functions described with reference to the illustrative logical blocks, modules, and steps may be stored in or transmitted over a computer-readable medium as one or more instructions or code and executed by a hardware-based processing unit. The computer-readable medium may include a computer-readable storage medium. The computer-readable storage medium corresponds to a tangible medium such as a data storage medium, or a communications medium including any medium that facilitates transfer of a computer program from one place to another place (for example, according to a communications protocol). In this manner, the computer-readable medium may generally correspond to: (1) a non-transitory tangible computer-readable storage medium, or (2) a communications medium, for example, a signal or a carrier. The data storage medium may be any available medium that can be accessed by one or more computers or one or more processors to retrieve instructions, code, and/or data structures for implementing the technologies described in this application. A computer program product may include a computer-readable medium.

By way of example and not limitation, some computer-readable storage media may include a RAM, a ROM, an EEPROM, a CD-ROM or another optical disc storage apparatus, a magnetic disk storage apparatus or another magnetic storage apparatus, a flash memory, or any other medium that can store required program code in a form of instructions or data structures and can be accessed by a computer. In addition, any connection is appropriately referred to as a computer-readable medium. For example, if instructions are transmitted from a website, a server, or another remote source through a coaxial cable, an optical fiber, a twisted pair, a digital subscriber line (DSL), or a wireless technology such as infrared, radio, and microwave, the coaxial cable, the optical fiber, the twisted pair, the DSL, or the wireless technology such as infrared, radio, and microwave is included in a definition of the medium. However, it should be understood that the computer-readable storage medium and the data storage medium may not include a connection, a carrier, a signal, or another transitory medium, but actually mean non-transitory tangible storage media. Magnetic disks and optical discs used in this specification include a compact disc (CD), a laser disc, an optical disc, a digital versatile disc (DVD), and a Blu-ray disc. The magnetic disks generally magnetically reproduce data, and the optical discs optically reproduce data with lasers. Combinations of the foregoing objects should also be included in the scope of the computer-readable medium.

Instructions may be executed by one or more processors such as one or more digital signal processors (DSP), a general-purpose microprocessor, an application-specific integrated circuit (ASIC), a field programmable gate array (FPGA), or another equivalent integrated or discrete logic circuit. Therefore, the term "processor" used in this specification may refer to the foregoing structure, or any other structure suitable for implementation of the technologies described in this specification. In addition, in some aspects, the functions described with reference to the illustrative logical blocks, modules, and steps described in this specification may be provided within dedicated hardware and/or software modules configured for encoding and decoding, or may be incorporated into a concatenated codec. In addition, the technologies may be all implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of the apparatuses configured to perform the disclosed technologies, but are not necessarily implemented by using different hardware units. Actually, as described above, various units may be combined into a codec hardware unit in combination with appropriate software and/or firmware, or may be provided by interoperable hardware units (including the one or more processors described above).

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, executed by a network device, the method comprising:
receiving a first call request message sent by an originating user equipment (UE), wherein the first call request message comprises indication information indicating that the originating UE supports a resource reservation procedure;
determining, according to first configuration information stored by the network device and the indication information, that for a call corresponding to the first call request message, a resource reservation procedure for first media is not supported and a resource reservation procedure for second media is supported, wherein the first media is call media to be transmitted between the originating UE and a terminating UE, and the second media is media to be played by a media server for the originating UE;
sending a second call request message to the media server based on the first call request message and the first configuration information stored by the network device, wherein the second call request message indicates that the resource reservation procedure for the first media is not supported and the resource reservation procedure for the second media is supported;
receiving a first update message from the media server, wherein the first update message comprises session description protocol (SDP) information of audio or video that is of the media server and that is for negotiation about the second media, and the first update message indicates that negotiation about the second media is performed through a resource reservation procedure;
forwarding the first update message to the originating UE; and
receiving a second response message from the originating UE that corresponds to the first update message, the second response message indicating that the originating UE has completed resource reservation for the second media.

2. The method according to claim 1, wherein the network device does not support the resource reservation procedure for the first media and supports the resource reservation procedure for the second media.

3. The method according to claim 1, wherein that the second call request message indicates that the resource reservation procedure for first media is not supported and the resource reservation procedure for second media is supported comprises:

a first header field of the second call request message does not comprise a first field, the absence of the first field indicating that the resource reservation procedure for the first media is not supported, and the second call request message comprises second indication information indicating that the resource reservation procedure for the second media is supported.

4. The method according to claim 3, wherein that the second call request message comprises the second indication information indicating that the resource reservation procedure for the second media is supported comprises:

the second call request message comprises a second field, and the second field indicates that a network supports the resource reservation procedure for the second media.

5. The method according to claim 1, wherein that the first call request message comprises the indication information indicating that the originating UE supports the resource reservation procedure comprises:

a first header field of the first call request message comprises a first field indicating that the originating UE supports the resource reservation procedure; and wherein sending the second call request message to the media server based on the first call request message and the first configuration information stored by the network device comprises:

deleting the first field in the first header field of the first call request message based on the first configuration information indicating that the network device does not support the resource reservation procedure for the first media and supports the resource reservation procedure for the second media, and inserting a second field indicating that a network supports the resource reservation procedure for the second media, to obtain the second call request message; and sending the second call request message to the media server.

6. The method according to claim 5, wherein the network device is a proxy-call session control function (P-CSCF) device.

7. The method according to claim 1, wherein the resource reservation procedure for the second media comprises the media server and the originating UE reserving a matched bandwidth, an available frequency band, or a port.

8. The method according to claim 1, further comprising:

receiving, by the media server, the second call request message, wherein the second call request message further indicates the originating UE initiates a call to the terminating UE;

sending, by the media server, the first update message to the network device; and receiving, by the media server, the second response message from the network device.

9. A system, comprising:
a media server; and
a network device;
wherein the network device is configured to:
receive a first call request message sent by an originating user equipment (UE), wherein the first call request message comprises indication information indicating that the originating UE supports a resource reservation procedure;
determine, according to first configuration information stored by the network device and the indication information, that for a call corresponding to the first call request message, a resource reservation procedure for first media is not supported and a resource reservation procedure for second media is supported, wherein the first media is call media to be transmitted between the originating UE and a terminating UE, and the second media is media to be played by a media server for the originating UE;
send a second call request message to the media server based on the first call request message and the first configuration information stored by the network device, wherein the second call request message indicates that the resource reservation procedure for the first media is not supported and the resource reservation procedure for the second media is supported;
receive a first update message from the media server, wherein the first update message comprises session description protocol (SDP) information of audio or video that is of the media server and that is for negotiation about the second media, and the first update message indicates that negotiation about the second media is performed through a resource reservation procedure;
forward the first update message to the originating UE; and
receive a second response message from the originating UE that corresponds to the first update message, the second response message indicating that the originating UE has completed resource reservation for the second media; and send the second response message to the media server; and
wherein the media server is configured to:
receive the second call request message, wherein the second call request message further indicates the originating UE initiates a call to the terminating UE; and
send the first update message to the network device; and
receive the second response message from the network device.

10. The system according to claim 9, wherein the media server is further configured to:

forward the second call request message to the terminating UE; and receive a first response message that corresponds to the second call request message and that is sent by the terminating UE, wherein the first response message indicates that negotiation about the first media is not performed through a resource reservation procedure.

11. The system according to claim 10, wherein the media server is further configured to:

send the first response message corresponding to the second call request message to the originating UE.

12. The system according to claim 9, wherein that the second call request message indicates that the resource reservation procedure for first media is not supported and the resource reservation procedure for second media is supported comprises:

a first header field of the second call request message does not comprise a first field, the absence of the first header field indicating that the resource reservation procedure for the first media is not supported, and the second call request message comprises indication information indicating that the resource reservation procedure for the second media is supported.

13. The system according to claim 12, wherein that the second call request message comprises indication information indicating that the resource reservation procedure for the second media is supported comprises:

the second call request message comprises a second field, and the second field indicates that a network supports the resource reservation procedure for the second media.

14. The system according to claim 9, wherein the resource reservation procedure for the second media comprises the media server and the originating UE reserving a matched bandwidth, an available frequency band, or a port.

15. A network device, comprising:

at least one processor; and a non-transitory computer-readable storage medium storing instructions that are executable by the at least one processor, the instructions including instructions to:

receive a first call request message sent by an originating user equipment (UE), wherein the first call request message comprises indication information indicating that the originating UE supports a resource reservation procedure;

determine, according to first configuration information stored by the network device and the indication information, that for a call corresponding to the first call request message, a resource reservation procedure for first media is not supported and a resource reservation procedure for second media is supported, wherein the first media is call media to be transmitted between the originating UE and a terminating UE, and the second media is media to be played by a media server for the originating UE;

send a second call request message to a media server based on the first call request message and the first configuration information stored by the network device, wherein the second call request message indicates that the resource reservation procedure for the first media is not supported and the resource reservation procedure for the second media is supported;

receive a first update message sent by the media server, wherein the first update message comprises session description protocol (SDP) of audio or video that is of the media server and that is configured to be used for negotiation about the second media, and the first update message indicates that negotiation about the second media is performed through a resource reservation procedure;

forward the first update message to the originating UE; and receive a response message from the originating UE that corresponds to the first update message, the response message indicating that the originating UE has completed resource reservation for the second media.

16. The network device according to claim 15, wherein that the second call request message indicates that the resource reservation procedure for first media is not supported and the resource reservation procedure for second media is supported comprises:

a first header field of the second call request message does not comprise a first field, the absence of the first field indicating that the resource reservation procedure for the first media is not supported, and the second call request message comprises indication information indicating that the resource reservation procedure for the second media is supported.

17. The network device according to claim 16, wherein that the second call request message comprises indication information indicating that the resource reservation procedure for the second media is supported comprises:

the second call request message comprises a second field, and the second field indicates that a network supports the resource reservation procedure for the second media.

18. The network device according to claim 15, wherein that the first call request message comprises indication information indicating that the originating UE supports the resource reservation procedure comprises:

a first header field of the first call request message comprises a first field, the first field indicating that the originating UE supports the resource reservation procedure; and sending the second call request message to the media server based on the first call request message comprises:

deleting the first field in the first header field of the first call request message based on the case in which the network device does not support the resource reservation procedure for the first media and supports the resource reservation procedure for the second media, and inserting a second field indicating that a network supports the resource reservation procedure for the second media, to obtain the second call request message; and sending the second call request message to the media server.

19. The network device according to claim 15, wherein the network device is a proxy-call session control function (P-CSCF) device.

20. The network device according to claim 15, wherein the resource reservation procedure for the second media comprises the media server and the originating UE reserving a matched bandwidth, an available frequency band, or a port.

* * * * *